(12) United States Patent
Tetsukawa et al.

(10) Patent No.: US 8,401,318 B2
(45) Date of Patent: Mar. 19, 2013

(54) MOTION VECTOR DETECTING APPARATUS, MOTION VECTOR DETECTING METHOD, AND PROGRAM

(75) Inventors: Hiroki Tetsukawa, Kanagawa (JP); Tetsujiro Kondo, Tokyo (JP); Kenji Takahashi, Kanagawa (JP); Kazushi Yoshikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 901 days.

(21) Appl. No.: 12/508,136

(22) Filed: Jul. 23, 2009

(65) Prior Publication Data

US 2010/0027900 A1 Feb. 4, 2010

(30) Foreign Application Priority Data

Jul. 30, 2008 (JP) ................. 2008-196614

(51) Int. Cl.
  *G06K 9/00* (2006.01)
  *G06K 9/46* (2006.01)
  *H04N 7/12* (2006.01)
(52) U.S. Cl. ........ 382/236; 382/103; 382/107; 382/197; 375/240.15; 375/240.16; 348/401.1; 348/402.1
(58) Field of Classification Search .............. 382/236, 382/103, 107, 197; 375/240.15, 240.16; 348/401.1, 402.1
See application file for complete search history.

(56) References Cited

U.S. PATENT DOCUMENTS

| | | | | |
|---|---|---|---|---|
| 5,544,263 A * | 8/1996 | Iwamura | ............... | 382/166 |
| 5,926,212 A * | 7/1999 | Kondo | ............... | 348/207.99 |
| 6,421,383 B2 * | 7/2002 | Beattie | ............... | 375/240.05 |
| 6,442,203 B1 * | 8/2002 | Demos | ............... | 375/240.16 |
| 6,574,368 B1 * | 6/2003 | Boon et al. | ............... | 382/232 |
| 2006/0285596 A1 * | 12/2006 | Kondo et al. | ............ | 375/240.16 |
| 2009/0141802 A1 | 6/2009 | Tetsukawa et al. | | |

FOREIGN PATENT DOCUMENTS

| | | |
|---|---|---|
| JP | 2003-256849 | 9/2003 |
| JP | 2005-175869 | 6/2005 |
| JP | 2005-175872 | 6/2005 |
| WO | WO 2007/026452 A1 | 3/2007 |

OTHER PUBLICATIONS

U.S. Appl. No. 12/510,964, filed Jul. 28, 2009, Tetsukawa, et al.
U.S. Appl. No. 12/512,426, filed Jul. 30, 2009, Tetsukawa, et al.

* cited by examiner

*Primary Examiner* — Michael A Newman
(74) *Attorney, Agent, or Firm* — Oblon, Spivak, McClelland, Maier & Neustadt, L.L.P.

(57) ABSTRACT

Generation of evaluation value information about a motion vector, extraction of candidates for the motion vector on the basis of the evaluation value information, and determination of the motion vector to be allocated from the candidates for the motion vector are performed. The possibility that a reference pixel a in a second frame is a candidate for a motion from a target point in a first frame is evaluated on the basis of pixel-value correlation information to generate an evaluation value table. A constant area is adaptively set around each of the target pixel and the reference pixel corresponding to each extracted candidate for the motion vector in accordance with the state of the continuity of a constant pixel value. The motion vector from the first frame to the second frame is allocated on the basis of the result of comparison between values calculated for the constant areas.

10 Claims, 23 Drawing Sheets

(AREA IN WHICH DIFFERENCE IN LUMINANCE BETWEEN EACH PIXEL AND TARGET POINT IS SMALLER THAN THRESHOLD VALUE AND WHICH IS SPATIALLY CONTIGUOUS TO TARGET POINT)

EXAMPLE OF FIXED MATCHING
ACCURACY RATE 72%

EXAMPLE OF MATCHING
IN CONSTANT AREA
ACCURACY RATE 90%

EXAMPLE OF MATCHING IN CONSTANT AREA
(USING SECOND REFERENCE FRAME)
ACCURACY RATE 99%

MOTION VECTOR DETECTING APPARATUS, MOTION VECTOR DETECTING METHOD, AND PROGRAM

BACKGROUND OF THE INVENTION

1. Field of the Invention

The present invention relates to a motion vector detecting apparatus and a motion vector detecting method that detect a motion vector from moving image data and that are preferably applicable to image processing, such as high-efficiency encoding, and to a program executing the motion vector detecting method.

2. Description of the Related Art

Hitherto, moving image processing is efficiently performed by using motion information, specifically, by using the directions and magnitudes of motions of objects in temporally different images. For example, results of motion detection are used in encoding between motion compensation frames in high-efficiency encoding of images and in parameter control using motions in television noise reduction apparatuses by using time domain filters between frames. Block matching is in widespread use as a method of detecting motions. In the block matching, an area in which each block moves is detected. The block is a unit including a predetermined number of pixels in one frame image. The detection of motion vectors by the block matching is put into practical use in, for example, Moving Picture Experts Group (MPEG) methods and is most popular as the image processing using motion vectors.

However, since the block matching is performed in units of blocks, the motion of the image in each frame is not necessarily detected accurately. Accordingly, the assignee has proposed a motion-vector detecting process disclosed in Japanese Unexamined Patent Application Publication No. 2005-175869. In the motion vector detecting process disclosed in Japanese Unexamined Patent Application Publication No. 2005-175869, an evaluation value concerning the motion of each pixel position is detected from an image signal, the detected evaluation value is held in an evaluation value table, and multiple vectors are extracted from the data in the evaluation value table as candidate vectors in one screen. Then, the correlation of each pixel between the frames connected to each other by the multiple extracted candidate vectors is determined. The candidate vector connecting a pixel determined to have the highest correlation is determined as a motion vector for the pixel. This processing will be described in detail below in the description of embodiments of the present invention.

FIG. 22 is a block diagram showing an example of the configuration of an evaluation-value-table generating unit used in the motion-vector detecting process when an evaluation value table is used to determine a motion vector. Referring to FIG. 22, an image signal input through an input terminal 1 is supplied to a correlation calculating part 2. The correlation calculating part 2 includes a reference point memory 2a, a target point memory 2b, and an absolute value calculator 2c. The image signal input through the input terminal 1 is first stored in the reference point memory 2a and the data stored in the reference point memory 2a is moved to the target point memory 2b. The image signal stored in the reference point memory 2a is one frame after the image signal stored in the target point memory 2b. Then, the pixel value of a target point is read out from the image signal stored in the target point memory 2b, and the pixel value of the pixel position selected as a reference point is read out from the image signal stored in the reference point memory 2a. The absolute value of the difference between the pixel value of the target point and the pixel value of the reference point is calculated by the absolute value calculator 2c. Data about the calculated absolute value of the difference is supplied to a correlation determining part 3. A comparator 3a in the correlation determining part 3 compares the data about the calculated absolute value of the difference with a predetermined threshold value to obtain an evaluation value. The evaluation value is exemplified by a correlation value. For example, if the difference is not higher the threshold value, it is determined that higher correlation is found.

The evaluation value obtained by the correlation determining part 3 is supplied to an evaluation-value-table calculating part 4. In the evaluation-value-table calculating part 4, an evaluation value integrator 4a integrates the evaluation values and the result of the integration is stored in an evaluation-value-table memory 4b. The data stored in the evaluation-value-table memory 4b is supplied to a downstream circuit through an output terminal 5 as evaluation value table data.

FIGS. 23A and 23B illustrate a processing state in which the evaluation value table in related art described above with reference to FIG. 22 is used to determine a motion vector. As shown in FIG. 23A, a pixel position in a previous frame F0, on which the determination of the motion vector is based, is set as a target point d0. The previous frame F0 is image data one frame before the current frame F1. A predetermined range around the pixel position of the target point d0 is set as a search area SA in the current frame F1. Each pixel in the search area SA is set as a reference point d1, an evaluation value of the reference point d1 is calculated, and the calculated evaluation value is stored in an evaluation value table. The reference point having the highest evaluation value in the search area SA, among the evaluation values registered in the evaluation value table, is determined as the pixel position on the current frame F1 which is the destination of a motion from the target point d0 on the previous frame F0. A motion vector is determined from the amount of motion between the reference point having the highest evaluation value and the target point, as shown in FIG. 23B.

It is possible to detect the motion vector on the basis of the evaluation value table data by the processing shown in FIG. 22 and FIGS. 23A and 23B.

SUMMARY OF THE INVENTION

In the detection of a motion vector based on the evaluation value table data, whether an optimal motion vector can be determined depends on the performance of the evaluation value table. In the method in related art shown in FIG. 22, the count of the motion destination candidate is raised in the evaluation value table on the basis of the determination result of the correlation between the target point and the pixel of the destination of a motion candidate in the search area in the future frame (the current frame), for example, if the absolute difference in luminance is smaller than a predetermined threshold value.

However, it is difficult to allocate an optimal motion vector in an even image in which the pixel values are almost constant by the method in the related art. Specifically, if the target point is an isolated point that differs in luminance or color from adjacent pixels, it is possible to accurately detect the candidates for the motion vector by detecting the reference point having the same state as in adjacent pixels.

In contrast, in the case of an even image, multiple pixels having the same pixel value exist around the target point and many motion destination candidates are detected. Accordingly, it is difficult to select the pixel of the motion destination from the many candidates (reference pixels).

In comparison between the target point and the reference point, it is possible to improve the accuracy of the detection of the motion vector in such an even part by expanding the target point and the reference point into a target area and a reference area, respectively, and performing matching between the target area and the reference area. However, in the matching between two frames by using the areas, it is difficult to appropriately set the areas where the matching is performed.

Specifically, when the target area and the reference area are relatively small, it is possible to accurately detect the candidate vectors by the matching if an even part including a constant pixel value is small. In contrast, if the even part including a constant luminance is larger than the areas used in the matching, many similar reference areas are detected, as in the case where the target point of one pixel is compared with the reference point of one pixel.

Conversely, when the target area and the reference area are relatively large, it is possible to accurately detect the candidate vectors by matching if the even part in the image is large. In contrast, if the even part is small, it is not possible to detect the small even part.

In addition, if another moving object enters the matching areas when the matching is performed by using the relatively large areas, mismatch is detected in the area matching and, therefore, it is not possible to appropriately allocate the motion vector.

In order to resolve the above problems, it is desirable to improve the accuracy of allocation of a motion vector by using an evaluation value of the motion vector. It is also desirable to accurately detect multiple motions in an image.

The present invention is applicable to detection of a motion vector from moving image data.

According to embodiments of the present invention, generation of evaluation value information about a motion vector, extraction of candidates for the motion vector on the basis of the evaluation value information, and determination of the motion vector to be allocated from the extracted candidates for the motion vector are performed.

The evaluation value information is generated on the basis of pixel-value correlation information indicating the correlation between a target pixel in a first frame and a reference pixel in a search area in a second frame. The evaluation value information indicates the result of evaluation of the possibility that the reference pixel is a candidate for a motion from the target point.

In the allocation of the motion vector, a constant area is adaptively set around each of the target pixel and the reference pixel corresponding to each extracted candidate for the motion vector in accordance with the state of the continuity of a constant pixel value. The motion vector from the first frame to the second frame is allocated on the basis of the result of comparison between values calculated for the constant areas.

According to the present invention, the size of the constant area is adaptively varied around the target pixel in accordance with the state of the image having a constant pixel value to appropriately narrow down the candidates for the motion vector according to the state of the image in order to allocate the motion vector. Accordingly, even if the pixel value of the target point is the same as the pixel values around the target point, it is possible to determine the destination of the motion vector. In addition, since the size of the constant area is adaptively set in accordance with the state of the image having a constant pixel value, the size of an area to be compared with the constant area has an appropriate size, thus allowing the accurate determination.

According to the present invention, the constant area adaptively set in accordance with the state of the image is used to allocate the motion vector from the evaluation value information about the motion vector, indicating a candidate for a motion between the target point and the reference point. Accordingly, it is possible to accurately detect the motion vector even if the target point is in a constant area having a constant pixel value.

Specifically, in the method of detecting the motion vector by using the evaluation value table including the data resulting from the evaluation of the target point and the reference points, the candidate vectors are searched for in units of pixels in the image. The effective evaluation can be performed in an area in which adjacent pixels have different pixel values. However, it is difficult to narrow down the candidate vectors in a constant area having a constant pixel value. According to the embodiments of the present invention, the constant area that is adaptively set in accordance with the state of the image is used to narrow down the candidate vectors on the basis of the evaluation values of the target point and the reference points. Accordingly, it is possible to accurately determine the motion vector to be allocated from the candidate vectors even if the target point is in the constant area having a constant pixel value. Since the constant area is adaptively set in accordance with the state of the image in the embodiments of the present invention, it is possible to accurately determine the motion vector to be allocated regardless of the size of the constant area.

In addition, the candidate vectors can be accurately detected both in constant areas and in areas including different pixel values. Accordingly, even if one image includes multiple motions, it is possible to accurately detect the motion vectors corresponding to the multiple motions in the image.

DESCRIPTION OF THE PREFERRED EMBODIMENTS

Embodiments of the present invention will herein be described in detail with reference to the attached drawings.

1. Outline of Configuration and Processing for Detection of Motion Vector

A motion vector detecting apparatus according to an embodiment of the present invention detects a motion vector from moving image data. In the detection of a motion vector, the motion vector detecting apparatus generates an evaluation value table from information about the correlation between pixel values and data in the evaluation value table is integrated to determine the motion vector.

Figure 1:
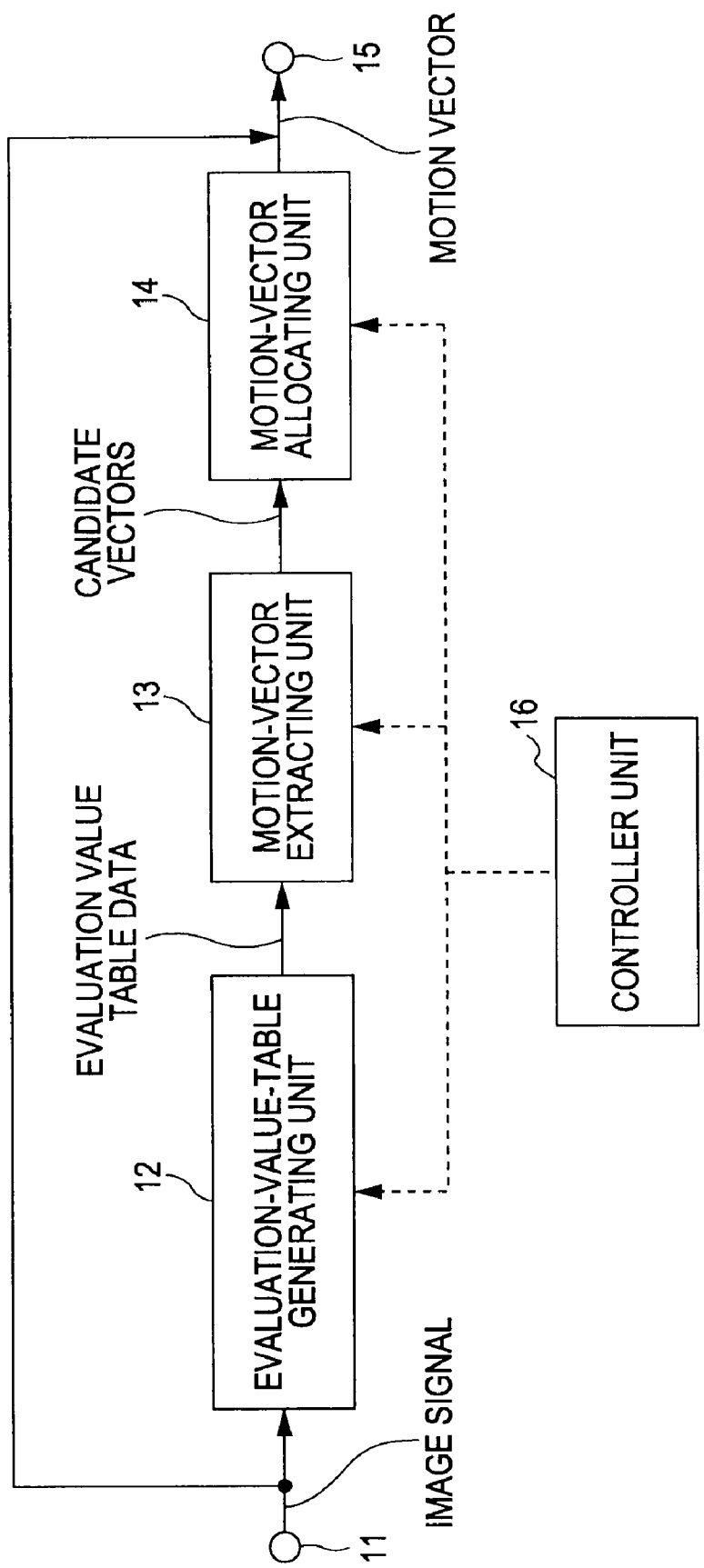
FIG. 1 is a block diagram showing an example of the configuration of a motion vector detecting apparatus according to an embodiment of the present invention.

FIG. 1 is a block diagram showing an example of the entire configuration of the motion vector detecting apparatus according to the embodiment of the present invention. Referring to FIG. 1, an image signal input through an input terminal 11 is supplied to an evaluation-value-table generating unit 12 where an evaluation value table is generated. The image signal is, for example, a digital video signal having a specific luminance for each pixel in each frame. The evaluation-value-table generating unit 12 generates the evaluation value table having the same size as a search area for every target point.

Data in the evaluation value table generated by the evaluation-value-table generating unit 12 is supplied to a motion-vector extracting unit 13. The motion-vector extracting unit 13 extracts multiple motion vectors from the evaluation value table as candidate vectors. The multiple candidate vectors are extracted on the basis of peaks appearing in the evaluation value table in the motion-vector extracting unit 13. The multiple candidate vectors extracted by the motion-vector extracting unit 13 are supplied to a motion-vector allocating unit 14.

The motion-vector allocating unit 14 allocates an appropriate candidate vector having the highest correlation, among the multiple candidate vectors extracted by the motion-vector extracting unit 13, to each pixel on the entire screen and determines the allocated candidate vector as a motion vector corresponding to the pixel. The process of determining the motion vector to be allocated from the candidate vectors will be described in detail below. The allocation of the motion vector is controlled by a controller unit 16.

Data about the determined motion vector is output through an output terminal 15. The data about the determined motion vector may output along with the image signal input through the input terminal 11, if necessary. The output data about the motion vector may be used in, for example, high-efficiency encoding of image data. The data about the motion vector may be used in improvement of the image quality when an image is displayed in a television receiver. Alternatively, the motion vector detected in the above processing may be used in other image processing.

Figure 2:
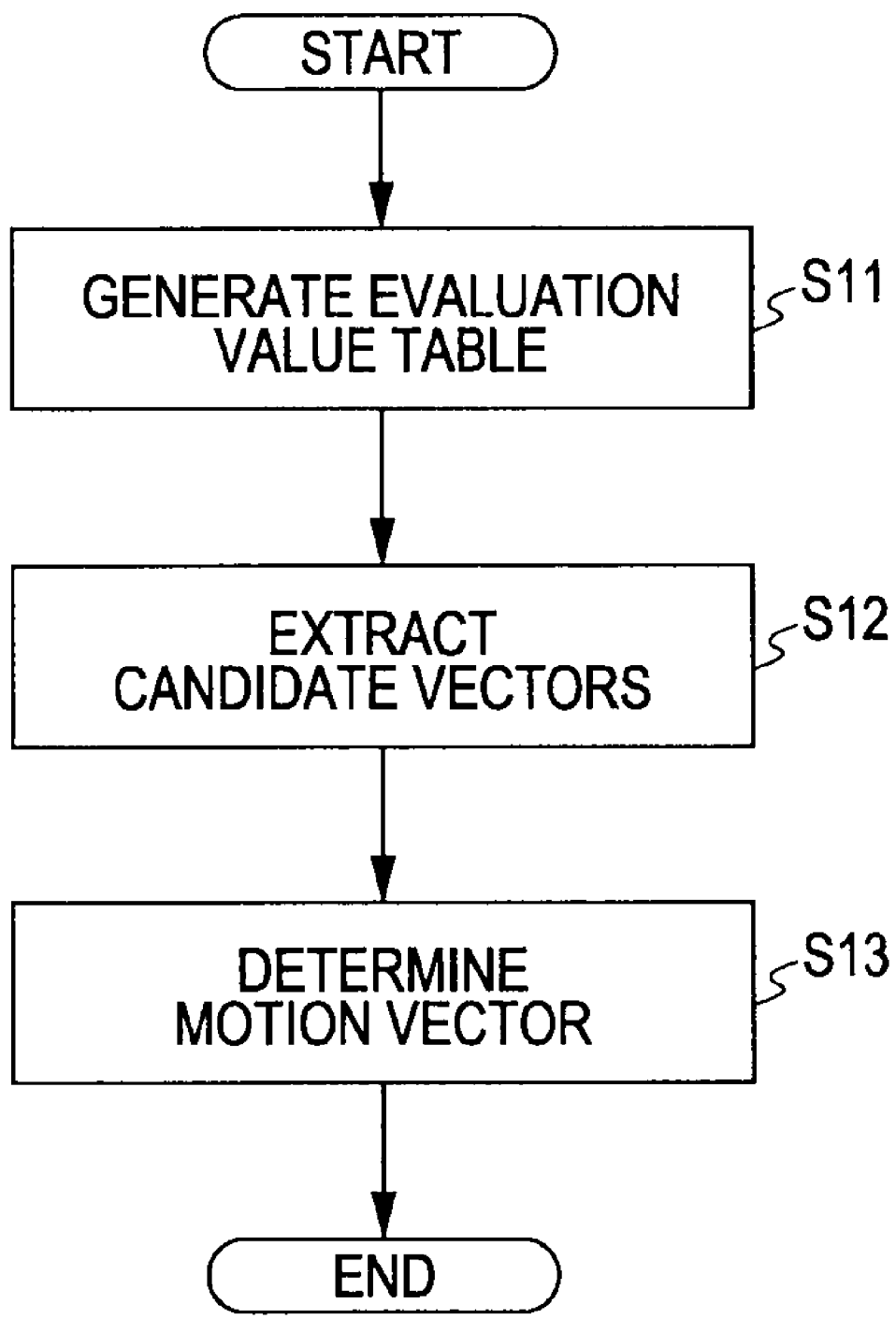
FIG. 2 is a flowchart showing an example of a process of determining a motion vector according to an embodiment of the present invention.

FIG. 2 is a flowchart showing an example of a process of determining a motion vector. Referring to FIG. 2, in Step S11, an evaluation value table is generated from an image signal that is input. In Step S12, multiple candidate vectors are extracted from the generated evaluation value table. In Step S13, the motion vector having the highest correlation is determined from the multiple extracted candidate vectors. The process shown in FIG. 2 is performed in each frame. The above processing is commonly performed in the detection of a motion vector by using the evaluation value table.

Figure 3:
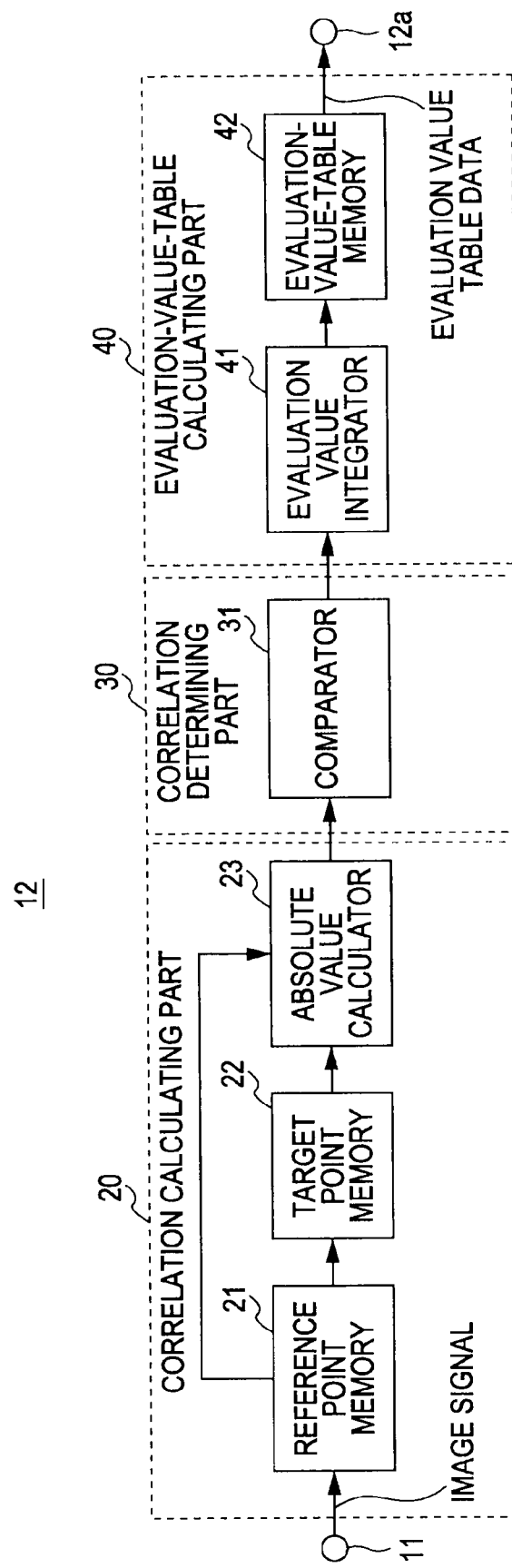
FIG. 3 is a block diagram showing an example of the configuration of an evaluation-value-table generating unit according to an embodiment of the present invention.

According to the present embodiment, the evaluation-value-table generating unit 12 generating an evaluation value table has a configuration shown in FIG. 3. In the following description, a target point means the pixel position (target pixel) of a point on which the determination of the motion vector is based. A reference point means the pixel position (reference pixel) of a point that may be a destination of a motion from the target point. The reference point is a pixel near the pixel position of the target point (that is, within the search area) in a frame after or before the frame in which the target point exists. The target point is sometimes referred to as the target pixel and the reference point is sometimes referred to as the reference pixel in the following description. The target pixel indicates the pixel at the position of the target point and the reference pixel indicates the pixel at the position of the reference point.

2. Example of How to Generate Evaluation Value Table

FIG. 3 is a block diagram showing an example of the configuration of the evaluation-value-table generating unit 12 that sets the target point and the reference point described above to generate an evaluation value table.

Referring to FIG. 3, an image signal input through the input terminal 11 is supplied to a correlation calculating part 20 in the evaluation-value-table generating unit 12. The correlation calculating part 20 includes a reference point memory 21, a target point memory 22, and an absolute value calculator 23. Each pixel value of a frame in which the reference point exists, in the image signal input through the input terminal 11, is stored in the reference point memory 21. The signal of the frame stored in the reference point memory 21 is moved to the target point memory 22 during the next frame period. In the example in FIG. 3, the reference point is on a frame before the frame in which the target point exists.

The pixel value of the target point stored in the target point memory 22 and the pixel value of the reference point stored in the reference point memory 21 are supplied to the absolute value calculator 23 where the absolute value of the difference between the signal of the pixel value of the target point and the signal of the pixel value of the reference point is calculated. The difference means the difference in luminance between the signal of the pixel value of the target point and the signal of the pixel value of the reference point. Data about the calculated absolute value of the difference is supplied to a correlation determining part 30. A comparator 31 in the correlation determining part 30 compares the data about the calculated absolute value of the difference with a predetermined threshold value to obtain an evaluation value. For example, it is determined that higher correlation is found if the difference is not higher than the threshold value and it is determined that lower correlation is found if the difference exceeds the threshold value.

The evaluation value obtained by the correlation determining part 30 is supplied to an evaluation-value-table calculating part 40. In the evaluation-value-table calculating part 40, an evaluation value integrator 41 integrates the evaluation values and the result of the integration is stored in an evaluation-value-table memory 42. The data stored in the evaluation-value-table memory 42 is supplied to a downstream circuit (the motion-vector extracting unit 13 in FIG. 1) through an output terminal 12a as evaluation value table data.

Figure 4:
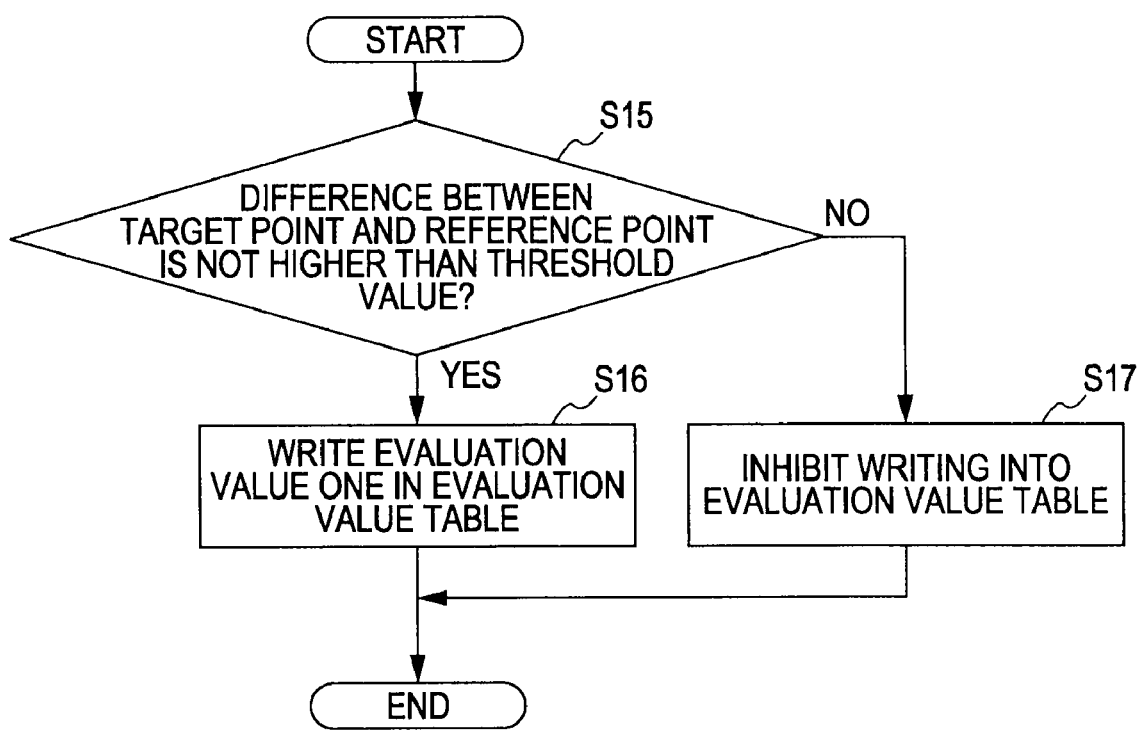
FIG. 4 is a flowchart showing an example of a process in the evaluation-value-table generating unit in FIG. 3.

FIG. 4 is a flowchart showing an example of a process of generating data in the evaluation value table in the evaluation-value-table generating unit 12 having the configuration shown in FIG. 3. The process shown in FIG. 4 is a determination process performed for all the motion vectors connecting each target point to the corresponding reference points and is performed by the correlation determining part 30.

Referring to FIG. 4, in Step S15, the correlation determining part 30 determines whether the difference between the target point and the reference point that are subjected to the comparison is not higher than a threshold value. If the correlation determining part 30 determines that the difference between the target point and the reference point is not higher than the threshold value, then in Step S16, the correlation determining part 30 sets the evaluation value of the corresponding vector to one and writes the evaluation value one in the evaluation value table. If the correlation determining part 30 determines that the difference between the target point and the reference point exceeds the threshold value, then in Step S17, the correlation determining part 30 sets the evaluation value of the corresponding vector to zero and writes the evaluation value zero in the evaluation value table.

The process shown in FIG. 4 is performed for all the reference points corresponding to each target point in one frame. The candidates for the motion vector having higher evaluation values, among the data written in the evaluation value table in the above manner, are read out by the motion-vector extracting unit 13 (FIG. 1) and the readout candidate vectors are supplied to the motion-vector allocating unit 14 described below.

3. Examples of Configuration and Operation of Motion-Vector Extracting Unit

An example of the configuration of the motion-vector extracting unit 13 in the motion vector detecting apparatus having the configuration shown in FIG. 1 and an example of the operation performed by the motion-vector extracting unit 13 will now be described with reference to FIGS. 5 and 6.

Figure 5:
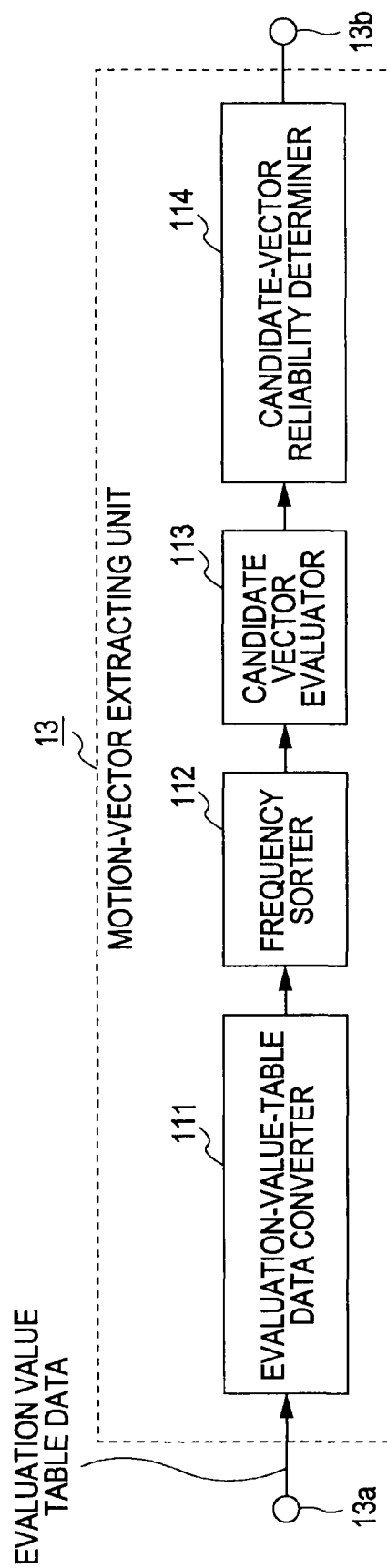
FIG. 5 is a block diagram showing an example of the configuration of a motion-vector extracting unit according to an embodiment of the present invention.

FIG. 5 is a block diagram showing an example of the configuration of the motion-vector extracting unit 13 shown in FIG. 1.

Referring to FIG. 5, the evaluation value table data is input through an input terminal 13a. The evaluation value table data is, for example, data in the evaluation value table of the motion vectors described above and results from integration of the vectors that is possibly determined as the candidate vectors in one frame.

For example, the evaluation value table data is data supplied from the evaluation-value-table memory 42 in the evaluation-value-table calculating part 40 in FIG. 3. The evaluation value table data is supplied to an evaluation-value-table data converter 111.

The evaluation-value-table data converter 111 converts the evaluation value table data supplied through the input terminal 13a into data indicating, for example, the frequency or the differentiation value of the frequency. The data resulting from the conversion is supplied to a frequency sorter 112 where the candidate vectors are sorted in frequency order in one frame. The evaluation value table data about the candidate vectors that are sorted in frequency order is supplied to a candidate vector evaluator 113. Specifically, among the candidate vectors that are sorted in frequency order, the candidate vectors up to a predetermined order from the top are supplied to the candidate vector evaluator 113. For example, the candidate vectors having the ten highest frequencies are extracted from the candidate vectors having higher frequencies in one frame and the extracted candidate vectors are supplied to the candidate vector evaluator 113.

The candidate vector evaluator 113 evaluates each of the supplied candidate vectors having higher frequencies on the basis of a predetermined condition. In the evaluation of the candidate vectors, for example, the candidate vectors having the frequencies that are not higher than a predetermined threshold value are excluded from the candidate vectors, even if they are within the predetermined frequency order.

A candidate-vector reliability determiner 114 selects the candidate vectors having higher reliabilities from the candidate vectors on the basis of the evaluation result of the candidate vectors evaluated by the candidate vector evaluator 113 in the above manner. Data about the candidate vectors having higher reliabilities are output through an output terminal 13b.

The reliability data about the candidate vectors output through the output terminal 13b is supplied to the motion-vector allocating unit 14 shown in FIG. 1.

Figure 6:
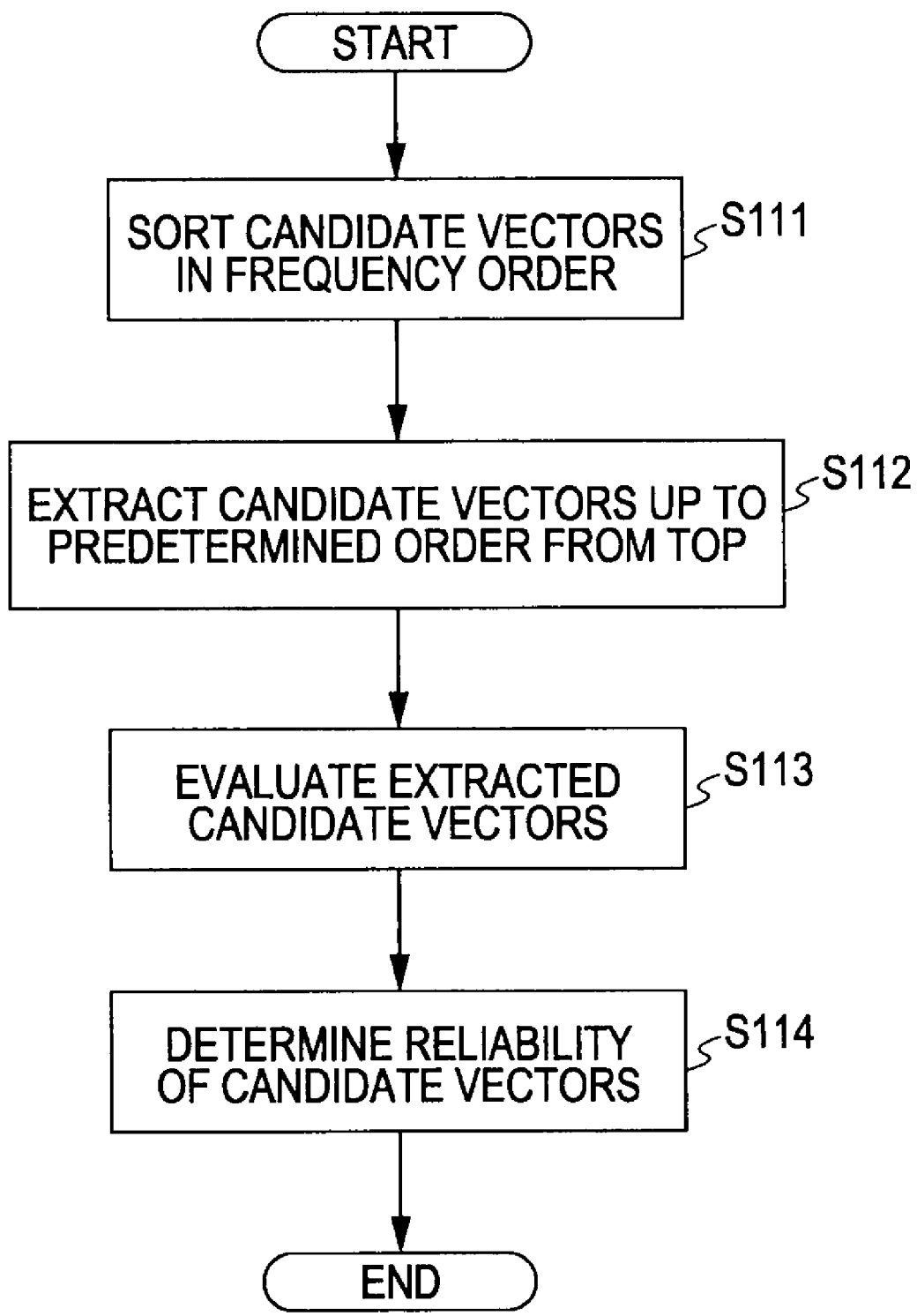
FIG. 6 is a flowchart showing an example of a process in the motion-vector extracting unit in FIG. 5.

FIG. 6 is a flowchart showing an example of a process of extracting the candidate vectors from the evaluation value table data in the motion-vector extracting unit 13 shown in FIG. 5.

Referring to FIG. 6, in Step S111, the motion-vector extracting unit 13 sorts the candidate vectors in the evaluation value table data in frequency order. In Step S112, the motion-vector extracting unit 13 extracts the candidate vectors up to a predetermined frequency order from the top from the evaluation value table in which the data is sorted in frequency order. For example, the motion-vector extracting unit 13 extracts the candidate vectors having ten highest frequencies.

In Step S113, the motion-vector extracting unit 13 evaluates whether the multiple extracted candidate vectors are appropriate for the candidate vectors and narrows down the candidate vectors, if necessary. For example, the motion-vector extracting unit 13 determines the frequencies of the extracted candidate vectors and decreases the evaluation values of the candidate vectors having the frequencies that are not higher than a threshold value. The evaluation of the candidate vectors can be performed by various method and the evaluation process affects the accuracy of the extraction of the candidate vectors.

In Step S114, the motion-vector extracting unit 13 determines the reliability of each candidate vector on the basis of the evaluation result and supplies only the candidate vectors having higher reliabilities, that is, only the candidate vectors that is likely to be allocated to the image, to the motion-vector allocating unit 14 (FIG. 1) downstream of the motion-vector extracting unit 13.

4. Example of Configuration of Motion-Vector Allocating Unit Using Areas

Figure 7:
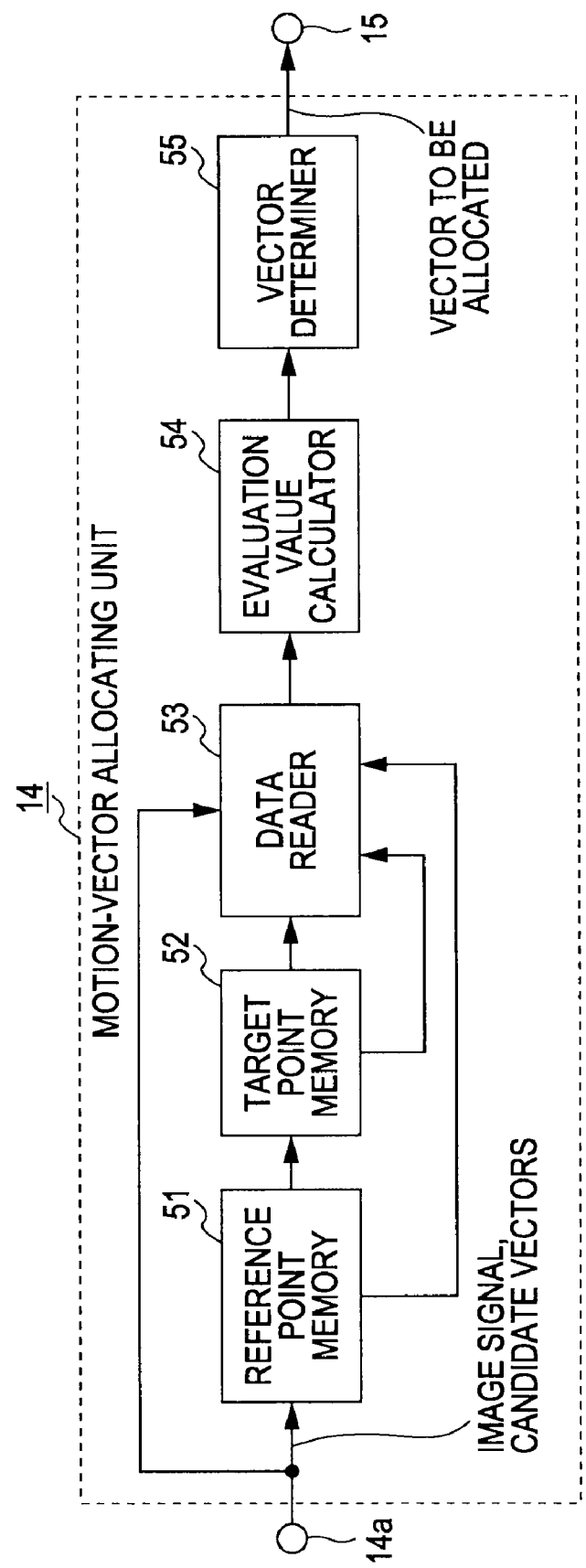
FIG. 7 is a block diagram showing an exemplary common configuration of a motion-vector allocating unit.

FIG. 7 is a block diagram showing an exemplary common configuration of the motion-vector allocating unit 14 shown in FIG. 1.

According to the present embodiment of the present invention, in the evaluation of the candidate vectors read out from the evaluation value table to determine a vector to be allocated, a constant area is adaptively set around the target point and a similar area is set around each reference point to determine whether each candidate vector is appropriately allocated as the motion vector.

The adaptive setting of the constant area around the target point features the present embodiment of the present invention. Before describing the configuration and processes according to the present embodiment of the present invention, an example in which a fixed block is set around the target point to perform the determination will now be described as a common configuration.

In the configuration shown in FIG. 7, the fixed area is set around the target point to perform the determination.

Data about each candidate for the motion vector and the image signal for the candidate vector are input through an input terminal 14a of the motion-vector allocating unit 14. The image signal is supplied to a reference point memory 51, which is a frame memory, where the image signal is stored during one frame. The image signal stored in the reference point memory 51 is moved to a target point memory 52 every frame period. Accordingly, the image signal stored in the reference point memory 51 shifts from the image signal stored in the target point memory 52 by one frame period.

Each pixel signal in a fixed block having a predetermined size around the target point is read out from the image signal stored in the target point memory 52 by a data reader 53. Similarly, each pixel signal of a fixed block having a predetermined size around the reference point is read out from the image signal stored in the reference point memory 51 by the data reader 53. The pixel positions (the target pixel and the reference pixel) of the target point and the reference point are read out from the data about the candidate vectors supplied from the motion-vector extracting unit 13 (FIG. 1) by the data reader 53.

Each pixel signal of the fixed area around the target point and each pixel signal of the fixed area around the reference point, which are read out by the data reader 53, are supplied to an evaluation value calculator 54 where the difference between the pixel signal of the fixed area around the target point and the pixel signal of the fixed area around the reference point is calculated. The evaluation value calculator 54 compares the pixel signals of the fixed areas around all the reference points connected to the target point that is being evaluated via the candidate vectors with the pixel signal of the fixed area around the target point.

The evaluation value calculator 54 selects a reference point having a fixed area that is most similar to the fixed area around the target point in the pixel value on the basis of the result of the comparison.

Data about the candidate vector connecting the selected the reference point to the target point is supplied to a vector determiner 55. The vector determiner 55 allocates the corresponding candidate vector as the motion vector from the target point. The candidate vector allocated as the motion vector is output through the output terminal 15.

Figure 8:
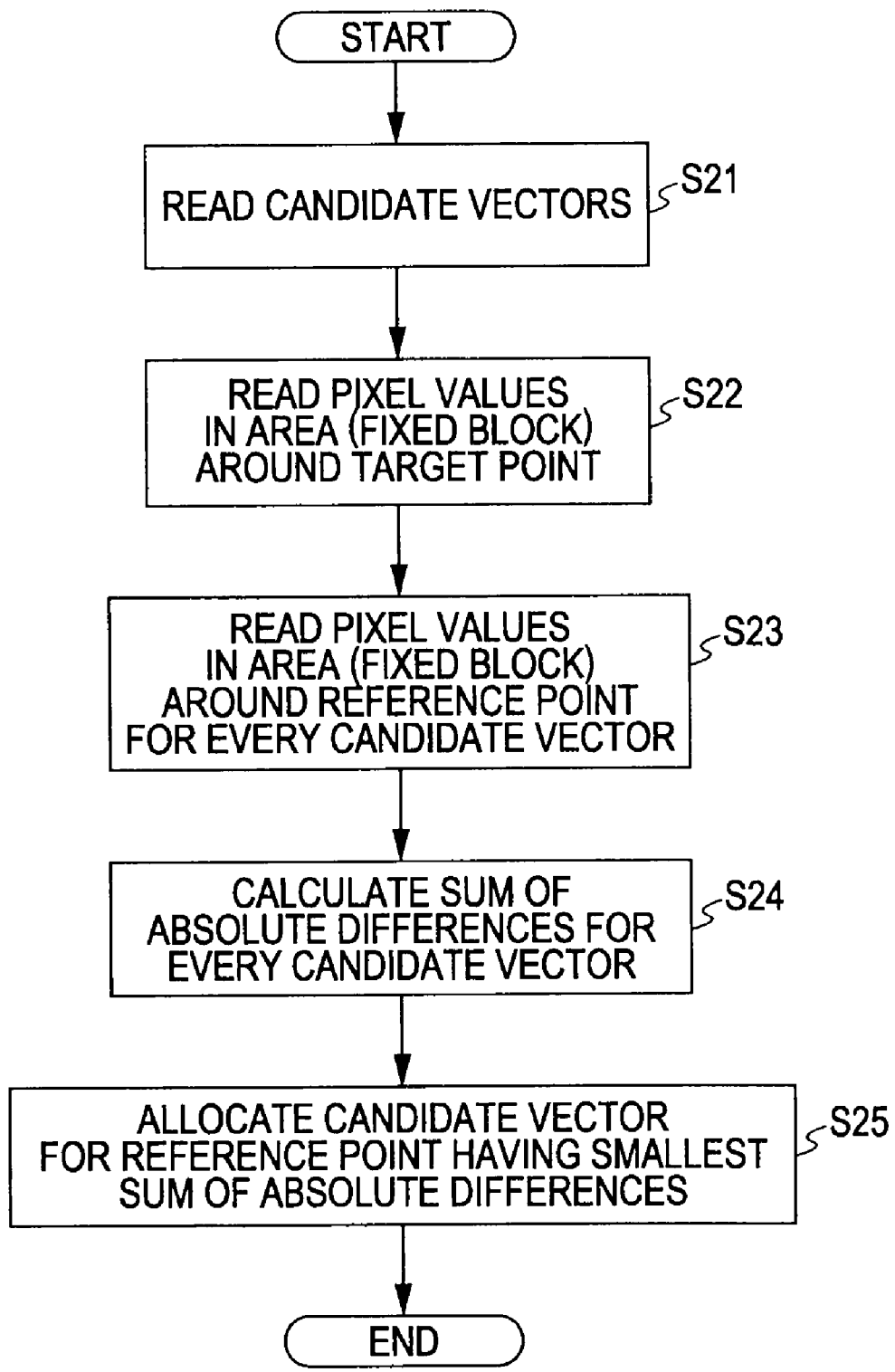
FIG. 8 is a flowchart showing an example of a process in the motion-vector allocating unit in FIG. 7.

FIG. 8 is a flowchart showing an example of a vector allocating process in the motion-vector allocating unit 14 having the configuration shown in FIG. 7.

Referring to FIG. 8, in Step S21, the motion-vector allocating unit 14 reads out the candidate vectors from the data in the evaluation value table. In Step S22, the motion-vector allocating unit 14 determines the coordinate position of the target point corresponding to the readout candidate vectors and reads out the pixel at the coordinate position (the target pixel) and the pixels in the fixed block around the target pixel from the target point memory 52. In Step S23, the motion-vector allocating unit 14 determines the coordinate positions of the reference points corresponding to the readout candidate vectors and reads out the pixel at each coordinate position (the reference pixel) and the pixels in the fixed block around the reference pixel from the reference point memory 51.

In Step S24, the motion-vector allocating unit 14 calculates a difference between the pixel level (the pixel value: the luminance in this example) of each pixel in the fixed block around the reference point and the pixel level of the corresponding pixel in the fixed block around the target point and adds up the absolute differences in the entire block to calculate the sum of the absolute differences. The above processing is performed for the reference points for all the candidate vectors corresponding to the current target point.

In Step S25, the motion-vector allocating unit 14 searches for the reference point having the smallest sum in the sums of the absolute differences resulting from the comparison between the multiple reference points and the target point. The motion-vector allocating unit 14 allocates the candidate vector connecting the found reference point to the target point as the motion vector from the target point.

Figure 9:
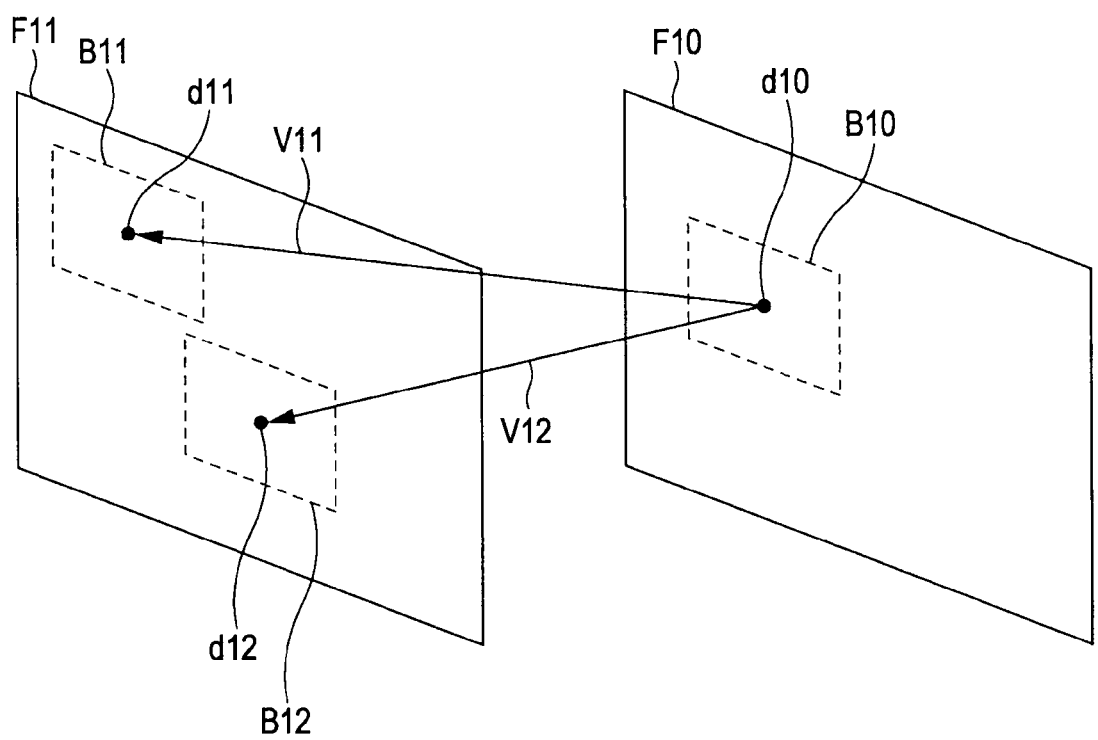
FIG. 9 illustrates an example of a processing state in the motion-vector allocating unit in FIG. 7.

FIG. 9 illustrates an example of a processing state in the configuration shown in FIG. 7 and the flowchart shown in FIG. 8.

In the example in FIG. 9, a target point d10 exists in a frame F10 (target frame) and multiple candidate vectors V11 and V12 extend from the target point d10 to a frame F11 (reference frame) that is next to the target frame F10 on the time axis. Reference points d11 and d12 connected to the target point d10 via the candidate vectors V11 and V12, respectively, exist in the reference frame F11.

On the assumption of the state shown in FIG. 9, in Step S22 in FIG. 8, a fixed block B10 of a predetermined number of pixels is set around the target point d10 in the target frame F10 and the pixel values in the fixed block B10 are determined. Similarly, in Step S23 in FIG. 8, fixed blocks B11 and B12 of a predetermined number of pixels are set around the reference points d11 and d12, respectively, in the reference frame F11 and the respective pixel values in the fixed blocks B11 and B12 are determined.

In Step S24 in FIG. 8, the difference between the pixel value of each pixel in the fixed block B11 and the pixel value of the corresponding pixel in the fixed block B10 is calculated, the absolute value of the difference is obtained, and the absolute differences in the entire block B11 are added up to calculate the sum of the absolute differences. Similarly, the difference between the pixel value of each pixel in the fixed block B12 and the pixel value of the corresponding pixel in the fixed block B10 is calculated, the absolute value of the difference is obtained, and the absolute differences in the entire block B12 are added up to calculate the sum of the absolute differences. In Step S25 in FIG. 8, the sums of the absolute differences calculated in Step S24 are compared with each other. If the comparison shows that the sum of the absolute differences for the fixed block B11 is smaller than the sum of the absolute differences for the fixed block B12, the candidate vector V11 connecting the reference point d11, which is the center of the fixed block B11, to the target point d10 is selected. The selected candidate vector V11 is allocated as the motion vector from the target point d10.

Although the two candidate vectors are used in the example in FIG. 9 for simplicity, three or more candidate vectors may actually exist for one target point. Although only one target point is shown in the example in FIG. 9 for simplicity, multiple pixels or all the pixels in one frame may be used as the target points.

The determination of the vector selected from the multiple candidate vectors as the motion vector in the above manner allows the reference point similar to the target point in the state of the pixels around the point to be selected, thus accurately selecting the motion vector from the candidate vectors.

However, when the fixed blocks are selected as the areas around the target point and the reference points as in the example shown in FIG. 9, it is difficult to accurately select the motion vector from the candidate vectors if the area around the target point is an even area including a constant luminance or color value.

For example, it is assumed that the target point is a pixel having a luminance level of white and the same luminance level is kept in the area around the target point. It is also assumed that the luminance level of white is kept at the reference points and in the areas around the reference points. In such a case, the sum of the absolute differences using the fixed block B11 is equal to the sum of the absolute differences using the fixed block B12 and, therefore, it is difficult to select the candidate vector to be allocated as the motion vector.

As described above, when the block for which the sum of the absolute differences is calculated is fixed, there is a problem in that it is not possible to appropriately allocate the motion vector if the areas around the target point and the reference points are even areas.

The following embodiments of the present invention are provided in order to resolve the above problems.

5. Example of Configuration of Main Parts According to First Embodiment

A first embodiment of the present invention will now be described with reference to FIGS. 10 to 17.

A motion vector detecting apparatus according to the first embodiment of the present invention has the configuration and performs the processes described above with reference to FIGS. 1 to 4. The motion vector detecting apparatus of the first embodiment includes the motion-vector allocating unit 14 having a configuration shown in FIG. 10.

Figure 10:
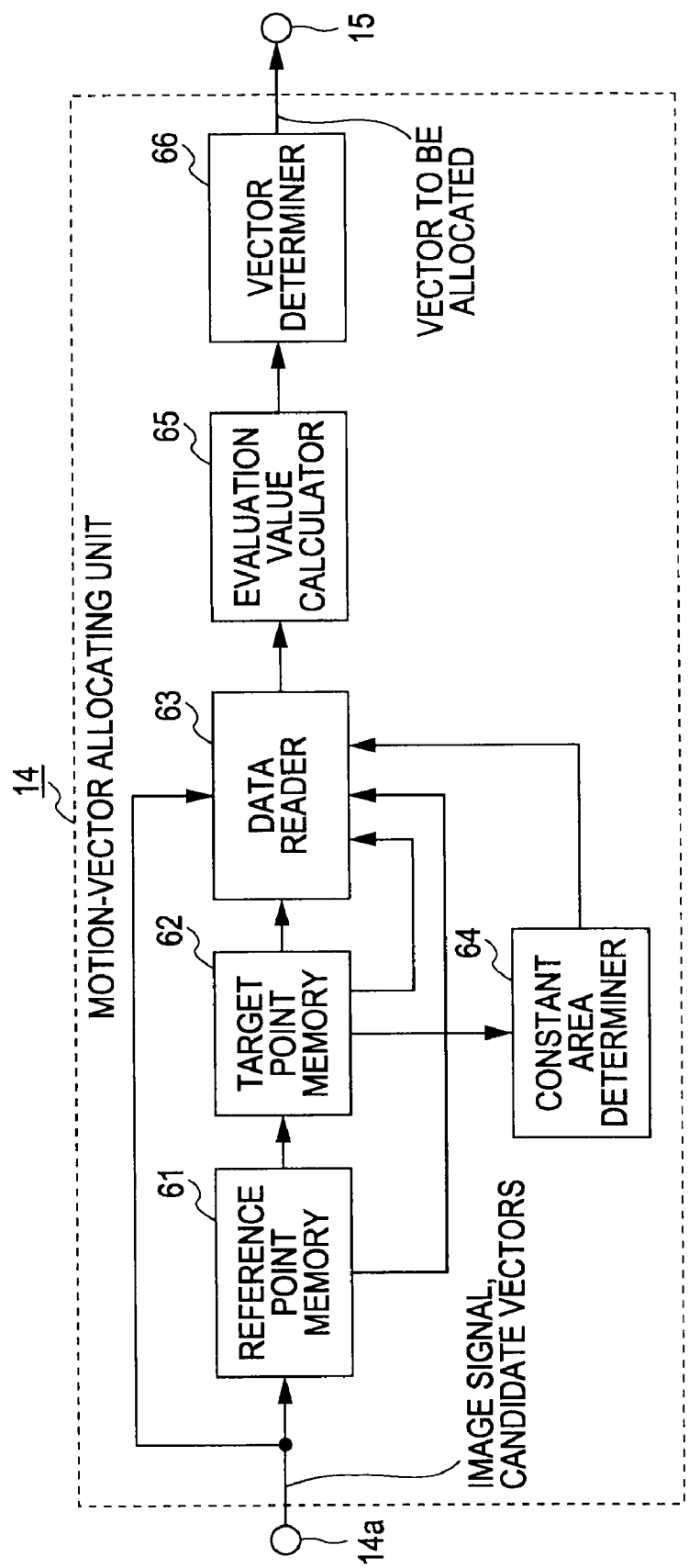
FIG. 10 is a block diagram showing an example of the configuration of a motion-vector allocating unit according to a first embodiment of the present invention.

FIG. 10 is a block diagram showing an example of the configuration of the motion-vector allocating unit 14 in the motion vector detecting apparatus of the first embodiment of the present invention.

Data about each candidate for the motion vector and the image signal for the candidate vector are input through the input terminal 14a of the motion-vector allocating unit 14. The image signal is supplied to a reference point memory 61, which is a frame memory, where the image signal is stored during one frame. The image signal stored in the reference point memory 61 is moved to a target point memory 62 every frame period. Accordingly, the image signal stored in the reference point memory 61 shifts from the image signal stored in the target point memory 62 by one frame period.

Each pixel signal in a constant area around the target point is read out from the image signal stored in the target point memory 62 by a data reader 63. The constant area is determined from the data stored in the target point memory 62 by a constant area determiner 64. The constant area determined by the constant area determiner 64 is around the target point and includes a constant pixel value in the same level as that of the target point. Accordingly, the size of the constant area is varied depending on the state of the image signal of each frame and the constant area is adaptively set. The constant area means an area that has a constant pixel value (luminance) and that is adaptively set in this specification. For example, if the difference between the pixel value of the target point and a pixel value in the constant area is smaller than a predetermined value, it is determined that the pixel value in the constant area is the same as that of the target point to accommodate a slight variation in the pixel value. No constant area may exist depending on the state of the image.

Each pixel signal in an area around the reference point is read out from the image signal stored in the reference point memory 61 by the data reader 63. The area that is read out here has the same size as that of the constant area around the target point. The pixel positions (the target pixel and the reference pixel) of the target point and the reference point are read out from the data about the candidate vectors supplied from the motion-vector extracting unit 13 (FIG. 1) by the data reader 63.

Each pixel signal in the constant area around the target point and each pixel signal in the area around the reference point, which has the same size as that of the constant area, are supplied to an evaluation value calculator 65 where the difference between the pixel signal in the constant area around the target point and the pixel signal in the area around the reference point is calculated to determine the correlation between the areas. The evaluation value calculator 65 compares the pixel signals in the areas that are around all the reference points connected to the target point that is being evaluated via the candidate vectors and that have the same size as that the constant area with the pixel signal in the constant area around the target point.

The evaluation value calculator 65 selects a reference point of an area that is most similar to the constant area around the target point in the pixel value on the basis of the result of the comparison. In the comparison here, the sums of the absolute differences resulting from adding up the absolute differences of the luminances of the pixels in the areas are compared with each other to select an area having the smallest sum of the absolute differences, as described below.

Data about the candidate vector connecting the reference point in the area selected by the evaluation value calculator 65 to the target point is supplied to a vector determiner 66. The vector determiner 66 allocates the candidate vector as the motion vector from the target point. The candidate vector allocated as the motion vector is output through the output terminal 15.

6. Example of Process in Motion-Vector Allocating Unit in FIG. 10

Figure 11:
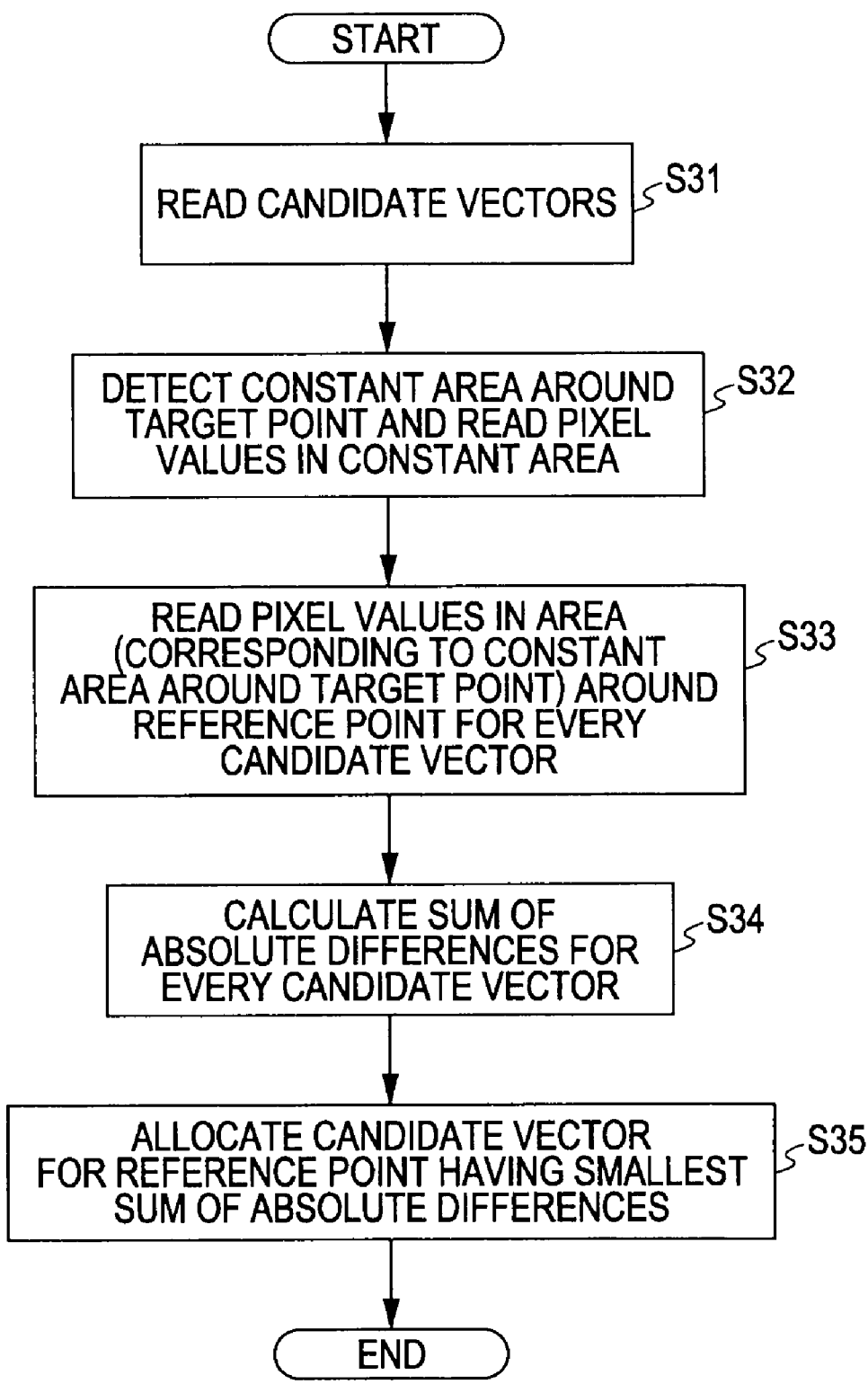
FIG. 11 is a flowchart showing an example of a process in the motion-vector allocating unit in FIG. 10.

FIG. 11 is a flowchart showing an example of a vector allocating process in the motion-vector allocating unit 14 having the configuration shown in FIG. 10.

Referring to FIG. 11, in Step S31, the motion-vector allocating unit 14 reads out the candidate vectors on the basis of the data in the evaluation value table. In Step S32, the motion-vector allocating unit 14 determines the coordinate position of the target point corresponding to the readout candidate vectors and determines the pixel value at the coordinate position (the target pixel) to detect an area (constant area) around the target point, having a constant pixel value that is determined to be the same as the pixel value of the target point. The motion-vector allocating unit 14 reads out the pixel values in the constant area.

In Step S33, the motion-vector allocating unit 14 determines the coordinate positions of the reference points corresponding to all the readout candidate vectors, sets areas having the same size as that of the constant area around the pixels (the reference pixels) at the coordinate positions, and reads out the pixel values in the areas that are set from the reference point memory 61.

In Step S34, the motion-vector allocating unit 14 calculates a sum of the absolute differences between the pixel levels (the pixel values) in the areas.

In Step S35, the motion-vector allocating unit 14 compares each pixel in the area around each reference point with the corresponding pixel in the constant area around the target point to calculate the difference, adds up the absolute differences in the entire area to calculate the sum of the absolute differences, and searches for the area around a reference point having the smallest sum of the absolute differences. The motion-vector allocating unit 14 allocates the candidate vector connecting the reference point, which is the center of the found area, to the target point as the motion vector from the target point.

7. Description of Processing State in Motion-Vector Allocating Unit in FIG. 10

Figure 12:
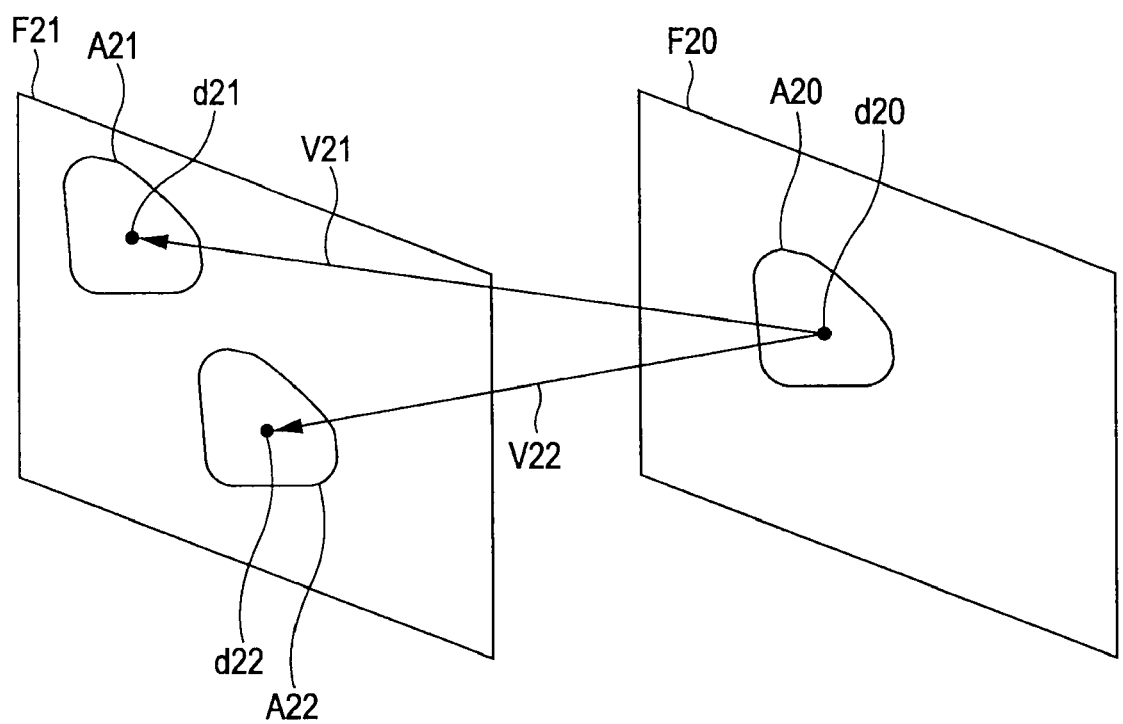
FIG. 12 illustrates an example of a processing state in the motion-vector allocating unit in FIG. 10.

FIG. 12 illustrates an example of a processing state in the configuration shown in FIG. 10 and the flowchart shown in FIG. 11.

In the example in FIG. 12, a target point d20 exists in a frame F20 (target frame) and multiple candidate vectors V21 and V22 extend from the target point d20 to a frame F21 (reference frame) that is next to the target frame F20 on the time axis. Reference points d21 and d22 connected to the target point d20 via the candidate vectors V21 and V22, respectively, exist in the reference frame F21.

On the assumption of the state shown in FIG. 12, in Step S32 in FIG. 11, a constant area A20 having the pixel values that are in the same level as that of the pixel value (luminance) of the target point d20 is set around the target point d20 in the target frame F20. The pixel values of all the pixels in the constant area A20 are determined.

In Step S33 in FIG. 11, areas A21 and A22 are set around the reference points d21 and d22, respectively, in the reference frame F21. The areas A21 and A22 each have the same size (the same number of pixels) as the constant area A20 set for the previous frame F20. The positional relationship between the reference points d21 and d22 and the areas A21 and A22 and the direction in which the areas are arranged are the same as those for the target point d20 and the constant area A20. The pixel values of all the pixels in each of the areas A21 and A22 set in the above manner are determined. In Step S34 in FIG. 11, the difference between the pixel value of each pixel in the area around each reference point and the pixel value of the corresponding pixel in the constant area A20 around the target point d20 is calculated and the absolute differences in the entire area are added up to calculate the sum of the absolute differences. The sum of the absolute differences is calculated for the area around each reference point. In Step S35 in FIG. 11, the sum of the absolute differences calculated for the area A21 and the constant area A20 is compared with the sum of the absolute differences calculated for the area A22 and the constant area A20. For example, if the comparison shows that the sum of the absolute differences calculated for the area A21 and the constant area A20 is smaller than the sum of the absolute differences calculated for the area A22 and the constant area A20, the candidate vector V21 connecting the reference point d21, which is the center of the area A21, to the target point d20 is selected. The selected candidate vector V21 is allocated as the motion vector from the target point d20.

Although the two candidate vectors are used in the example in FIG. 12 for simplicity, three or more candidate vectors may actually exist for one target point. Although only one target point is shown in the example in FIG. 12 for simplicity, multiple pixels or all the pixels in one frame may be used as the target points.

8. Example of Process of Searching for Constant Area

Figure 13:
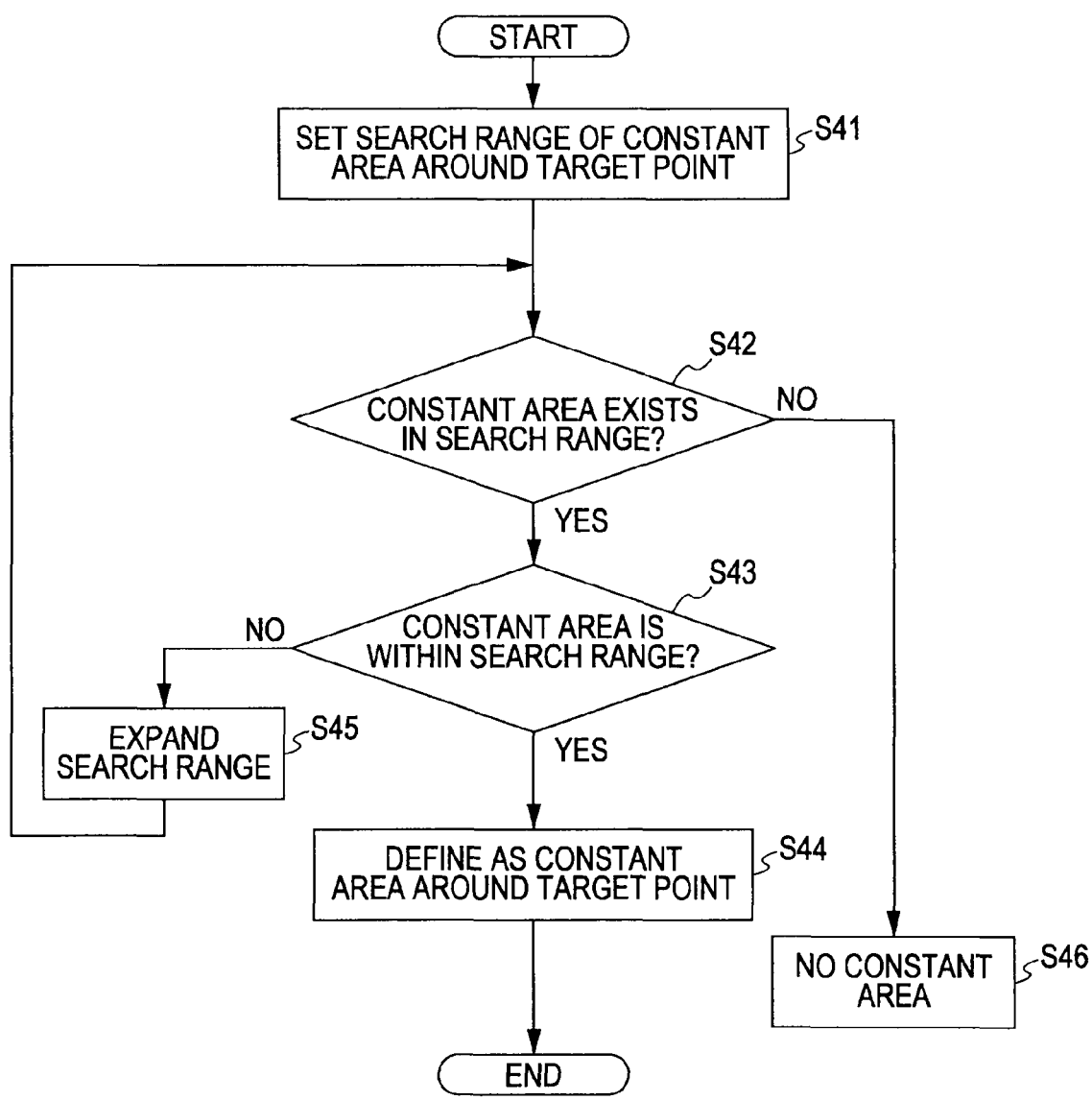
FIG. 13 is a flowchart showing an example of a process of searching for a constant area according to the first embodiment of the present invention.

FIG. 13 is a flowchart showing an example of a process of searching for the constant area around the target point according to the first embodiment of the present invention. The process shown in FIG. 13 will now be described with reference to examples in FIGS. 14A and 14B.

Referring to FIG. 13, in Step S41, a search range of the constant area is set around the target point that is determined. The search range of the constant area has a predetermined size. For example, the search range includes horizontal N pixels and vertical M pixels (N and M are arbitrary integer numbers).

Figure 14A:
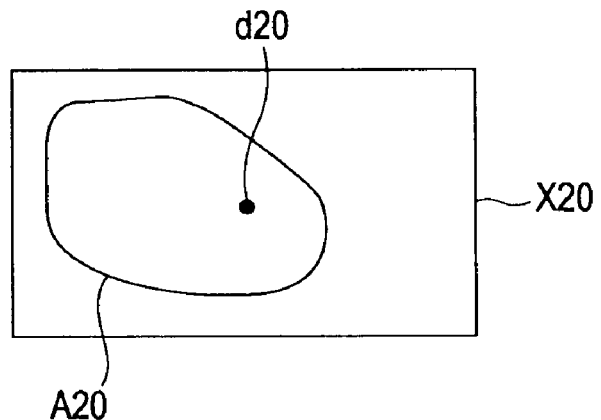
FIGS. 14A and 14B illustrate the searching state in FIG. 13.
Figure 14B:
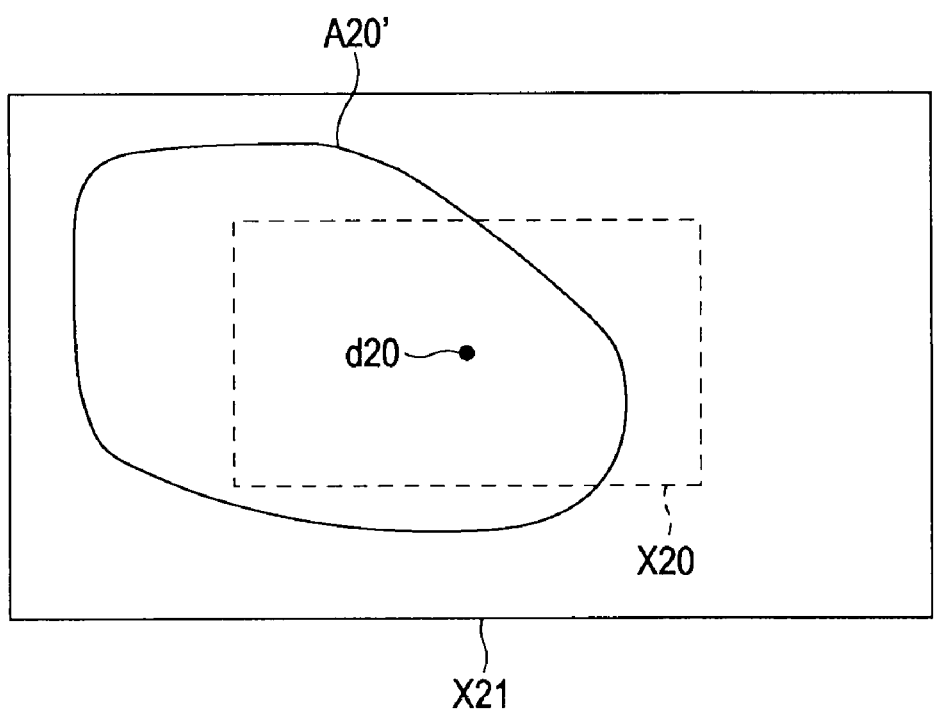

In the example shown in FIG. 14A, the constant area is searched for in a range X20.

The pixel value of each pixel in the search range X20 of the constant area is determined to search for the constant area A20 having a constant pixel value that is the same as the pixel value of the target point d20 in the search range X20. Each pixel in the constant area A20 is defined so as to have a pixel value that is determined to be the same as the pixel value of the target point and so as to be spatially contiguous to the target point. Specifically, if the difference between the pixel value of each pixel in the constant area A20 and the pixel value (luminance) of the target point is smaller than a predetermined threshold value, it is determined that the pixel value of each pixel in the constant area A20 is the same as the pixel value (luminance) of the target point.

In Step S42, it is determined whether the constant area A20 exists in the search range X20. If it is determined that no constant area exists in the search range X20, then in Step S46, it is determined that no constant area exists.

If it is determined in Step S42 that the constant area A20 exists in the search range X20, then in Step S43, it is determined whether the constant area A20 is within the search range X20. For example, the determination in Step S43 is based on whether any pixel on the perimeter of the search range X20 is included in the constant area A20.

If it is determined in Step S43 that the constant area A20 is within the search range X20, then in Step S44, the constant area that has been found is defined as the constant area A20 around the target point d20.

If it is determined in Step S43 that the constant area A20 is not within the search range X20, then in Step S45, the search range is expanded and the process goes back to Step S42 to determine whether the constant area A20 exists in the search range X20. For example, if the constant area is over the search range X20, as in the example in FIG. 14B in which a constant area A20' is over the search range X20, an expanded search range X21 of the constant area is reset and the constant area A20' is searched for again in the range X21.

The constant area is appropriately searched for in the range that is in accordance with the state of the image in the above manner.

In the expansion of the search range in Step S45, the maximum search range may be set in advance. If the constant area reaches the maximum range, the area found in the maximum range may be defined as the constant area.

9. Example of Normalization of Sum of Absolute Differences in Level

In the comparison between the area around the reference point and the constant area around the target point, all the pixels in the area around the reference point are compared with the corresponding pixels in the constant area around the target point to calculate the difference between the pixel values and the absolute differences are added up in the entire area to calculate the sum of the absolute differences, as described above. The calculated sum of the absolute differences may be normalized by using the number of pixel in the area.

Figure 15:
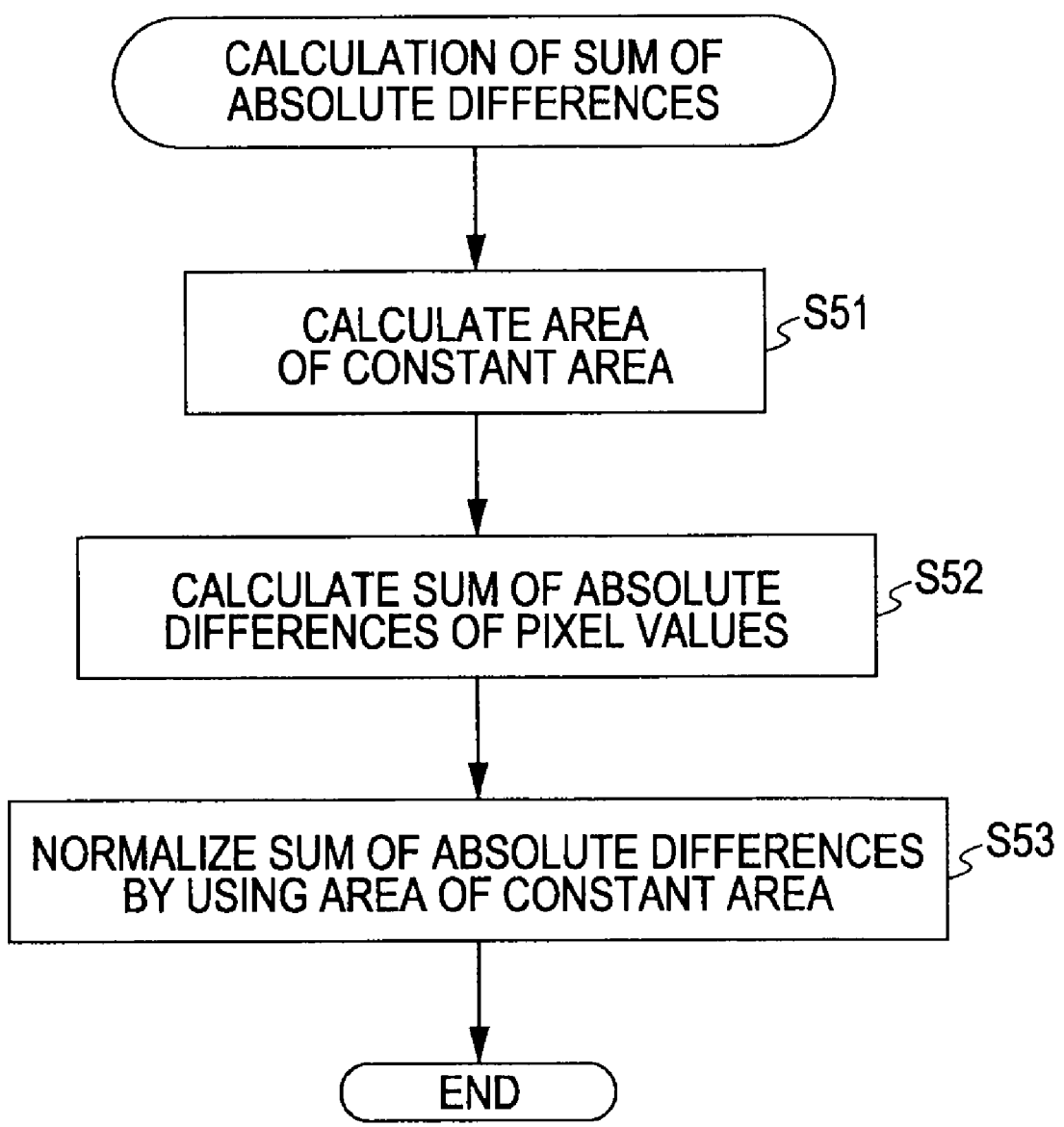
FIG. 15 is a flowchart showing an example of a normalization process of the sum of absolute differences according to the first embodiment of the present invention.

FIG. 15 is a flowchart showing an example of a normalization process.

Referring to FIG. 15, in Step S51, the area of the constant area (or the number of pixels in the constant area) is calculated. In Step S52, comparison with the constant areas to calculate the sums of the absolute differences for all the pixel values in the area around each reference point. In Step S53, the calculated sums of the absolute differences are normalized by using the area of the constant area (or the number of pixels in the constant area) to calculate the average of the absolute differences per pixel.

Comparison between the averages of the absolute differences calculated for each pixel by the normalization can be performed to accommodate any error in the sum of the absolute differences caused by, for example, a noise.

10. Example of Determination by Using Frequency of Evaluation Value

Although the candidate vector to be allocated is determined only from the comparison between the sum of the absolute differences in the constant area around the target point and the sum of the absolute differences in the area around each reference point in the process shown in the flowchart in FIG. 11, the candidate vector to be allocated may be determined in accordance with additional condition.

An example will now be described in which the candidate vector to be allocated is determined on the basis of the frequency of each candidate vector, which is an allocation condition.

Figure 16:
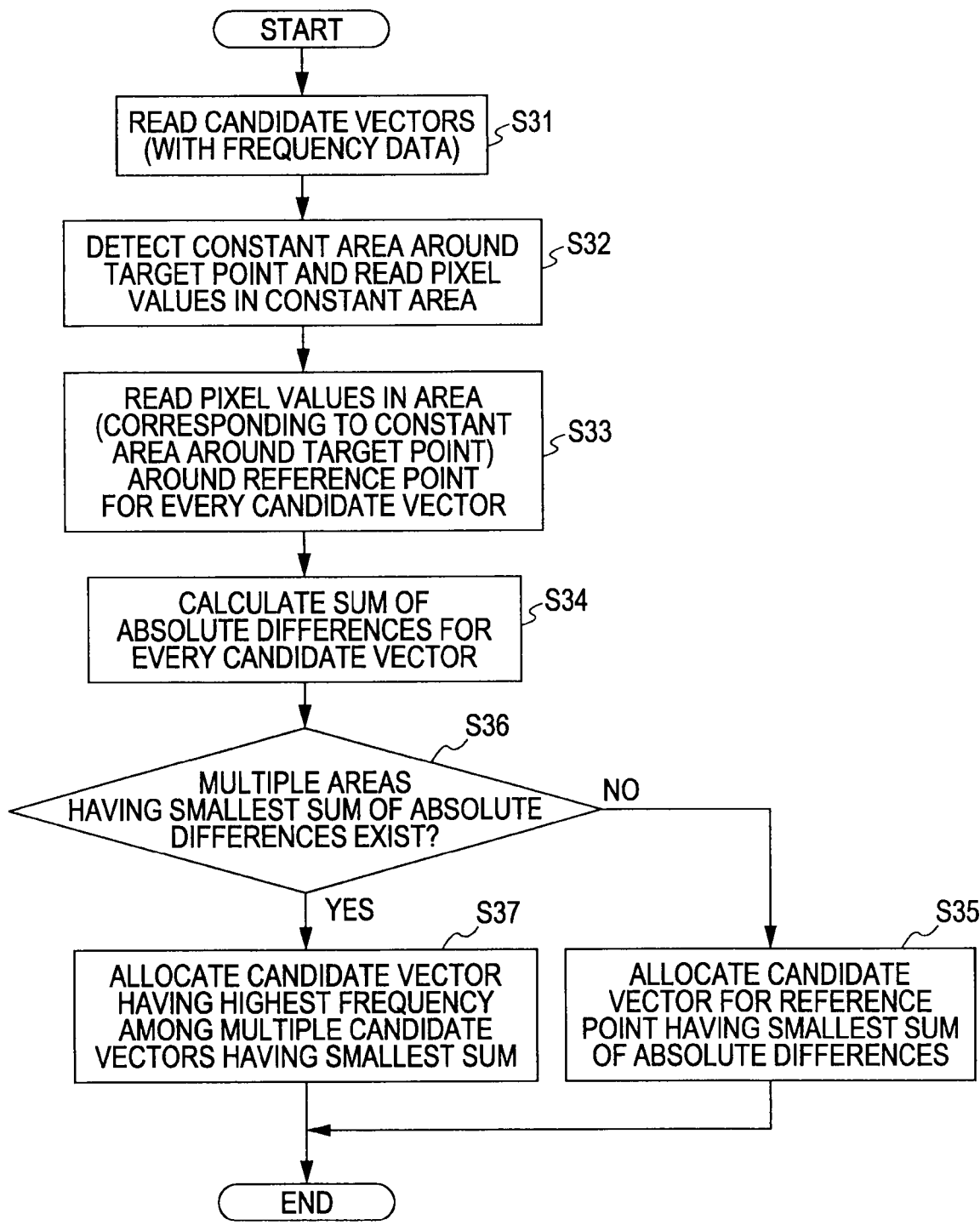
FIG. 16 is a flowchart showing an example of a process of using frequency data according to a modification of the first embodiment of the present invention.

FIG. 16 is a flowchart showing an example of a process of determining the frequency of each candidate vector according to a modification of the first embodiment of the present invention. The same reference numerals are used in FIG. 16 to identify the same steps shown in the flowchart in FIG. 11.

Referring to FIG. 16, the same steps as in the process shown in FIG. 11 are performed from the readout of the candidate vectors (Step S31) to the calculation of the sum of the absolute differences in the pixel level (Step S34). However, data indicating how often each candidate vector appears in the same frame is added to the candidate vector read out in Step S31. The frequency indicates, for example, the order of the candidate vectors sorted according to the motion direction and the amount of motion in one frame. Alternatively, the order of the candidate vectors sorted in the multiple previous frames may be used as the frequency.

After the sum of the absolute differences in the area around each reference point is calculated for every candidate vector in Step S34, then in Step S36, it is determined whether multiple areas having the smallest sum of the absolute differences exist. It may be determined that multiple areas having the smallest sum of the absolute differences exist when multiple areas have approximately the same sum, instead of completely the same sum.

If it is determined in Step S36 that multiple areas having the smallest sum of the absolute differences do not exist, then in Step S35, the candidate vector connecting the reference point, which is the center of the area determined to have the smallest sum of the absolute differences, to the target point is allocated as the motion vector from the target point, as in the example in FIG. 11.

If it is determined in Step S36 that the multiple areas having the smallest sum of the absolute differences exist, then in Step S37, the candidate vector having the highest frequency is selected from the candidate vectors for the areas having the smallest sum of the absolute differences on the basis of the frequency data about the candidate vectors and the selected candidate vector is allocated as the motion vector from the target point.

Narrowing down the candidate vectors by using the frequency data as in the process shown in FIG. 16 allows the allocation of the motion vector to be appropriately performed even if multiple areas having the smallest sum of the absolute differences exist.

Although the frequency data is used in the process in FIG. 16 if multiple areas having the smallest sum of the absolute differences exist, the candidate vectors may be narrowed down by using the frequency data if the sums of the absolute differences for the multiple areas is within a predetermined range.

11. Example of Determination on the Basis of Overlap of Constant Area

Figure 17:
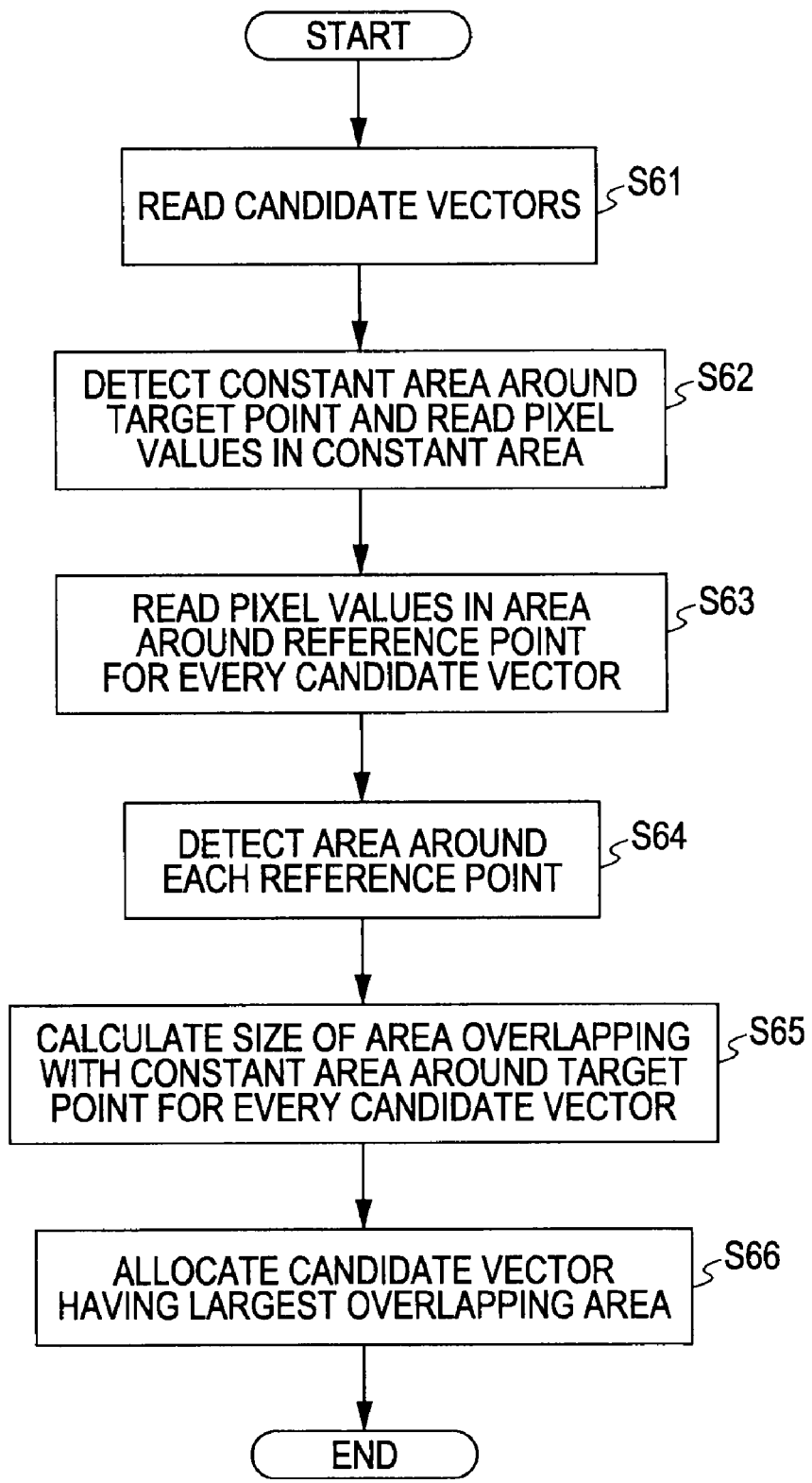
FIG. 17 is a flowchart showing an example of a determination process based on any overlap with the constant area according to a modification of the first embodiment of the present invention.

FIG. 17 is a flowchart showing an example of a process of extracting the optimal area from the areas around the reference points on the basis of a condition other than the sum of the absolute differences and allocating the candidate vector corresponding to the extracted optimal area as the motion vector from the target point, according to a modification of the first embodiment of the present invention.

In the process in FIG. 17, the determination is based on any overlap between the constant area around the target point and the area around each reference point.

Referring to FIG. 17, in Step S61, the candidate vectors are read out on the basis of the data in the evaluation value table. In Step S62, the coordinate position of the target point corresponding to the readout candidate vectors is determined and the pixel value at the coordinate position (of the target pixel) is determined to detect an area (constant area) around the target point, having the pixel value that is determined to be the same as the pixel value of the target point. The pixel values in the constant area are read out.

In Step S63, the coordinate positions of the reference points corresponding to all the readout candidate vectors are determined, areas having the same size as that of the constant area are set around the pixels (the reference pixels) at the coordinate positions, and the pixel values in the areas that are set are read out from the reference point memory 61. The area around each reference pixel is set in the same manner as in the process shown in FIG. 11.

In Step S64, the coordinate positions of the area set around each reference point is detected. In Step S65, the size of the area overlapping with the constant area around the target point is calculated for the area around each reference point. In Step S66, the reference point of the largest area overlapping with the constant area around the target point is determined.

The candidate vector connecting the reference point, which is the center of the largest area overlapping with the constant area around the target point, to the target point is determined as the motion vector to be allocated.

As described above, the motion vector to be allocated can be determined on the basis of the overlap between the constant area around the target point and the area around each reference point.

12. Example of Configuration of Main Parts According to Second Embodiment

Using Two Reference Frames

A second embodiment of the present invention will now be described with reference to FIGS. 18 to 20.

A motion vector detecting apparatus according to the second embodiment of the present invention has the configuration and performs the processes described above with reference to FIGS. 1 to 4. The motion vector detecting apparatus of the second embodiment includes the motion-vector allocating unit 14 having a configuration shown in FIG. 18. The motion vector is determined by the processing between the frame of the target point and the frame of the reference points in the first embodiment whereas the reference points in another frame are also considered in the second embodiment.

Figure 18:
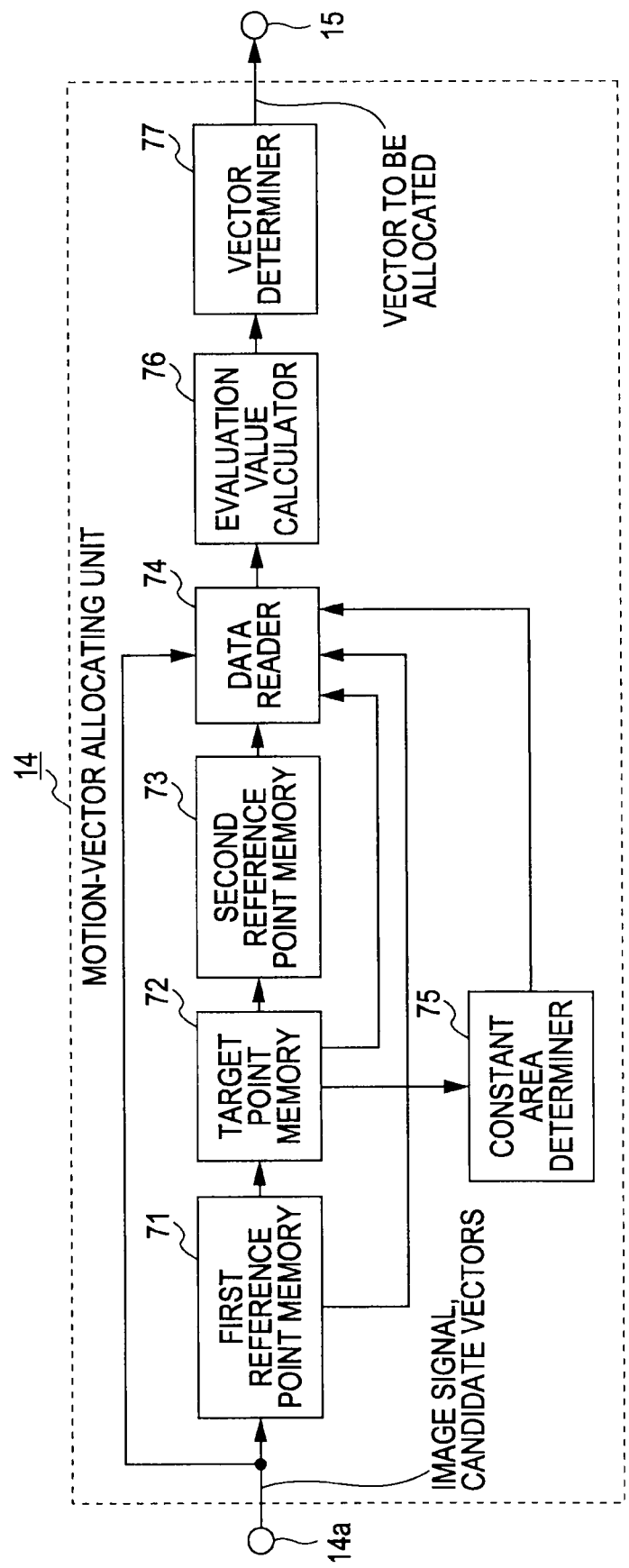
FIG. 18 is a block diagram showing an example of the configuration of a motion-vector allocating unit according to a second embodiment of the present invention.

FIG. 18 is a block diagram showing an example of the configuration of the motion-vector allocating unit 14 in the motion vector detecting apparatus according to the second embodiment of the present invention.

Data about each candidate for the motion vector and the image signal for the candidate vector are input through the input terminal 14a of the motion-vector allocating unit 14. The image signal is supplied to a first reference point memory 71, which is a frame memory, where the image signal is stored during one frame. The image signal stored in the first reference point memory 71 is moved to a target point memory 72 every frame period. In addition, the image signal stored in the target point memory 72 is moved to a second reference point memory 73 every frame period. Accordingly, the image signal stored in the first reference point memory 71 shifts from the image signal stored in the target point memory 72 by one frame period, and the image signal stored in the target point memory 72 shifts from the image signal stored in the second reference point memory 73 by one frame period. The image signal of each frame stored in the second reference point memory 73 is an image signal one frame before the frame stored in the target point memory 72. The image signal of each frame stored in the first reference point memory 71 is one frame after the frame stored in the target point memory 72. The frame stored in the first reference point memory 71 is referred to as a first reference frame and the frame stored in the second reference point memory 73 is referred to as a second reference frame in the following description.

Each pixel signal in a constant area around the target point is read out from the image signal stored in the target point memory 72 by a data reader 74. The constant area is determined from the data stored in the target point memory 72 by a constant area determiner 75. The constant area determined by the constant area determiner 75 is around the target point and has a constant pixel value in the same level as that of the target point. Accordingly, the size of the constant area is varied depending on the state of the image signal of each frame and the constant area is adaptively set.

Each pixel signal in an area around the reference point is read out from the image signal stored in the first reference point memory 71 by the data reader 74. The area that is read out here has the same size as that of the constant area around the target point. The pixel signal of the reference point opposite to the reference point read out from the first reference point memory 71 with respect to the target point and the pixel signals of the area around the opposite reference point are read out from the second reference point memory 73 by the data reader 74. The area that is read out here also has the same size as that of the constant area around the target point. The pixel positions of the target point and the two reference points (the target pixel and the reference pixels) are read out from the data about the candidate vectors supplied from the motion-vector extracting unit 13 (FIG. 1) by the data reader 74.

Each pixel signal in the constant area around the target point and each pixel signal in the areas around the reference points in the two frames, which have the same size as that of the constant area, are supplied to an evaluation value calculator 76 where the difference between the pixel signal in the constant area around the target point and the pixel signal in the area around each reference point is calculated. The evaluation value calculator 76 compares the pixel signals in the areas that are around all the reference points connected to the target point that is being evaluated via the candidate vectors and around the reference points opposite to the above reference points and that have the same size as that of the constant area with the pixel signal in the constant area around the target point.

The evaluation value calculator 76 selects the reference point in an area that is most similar to the constant area around the target point in the pixel value on the basis of the result of the comparison. In the comparison here, the sums of the absolute differences resulting from adding up the absolute differences of the luminances of the pixels in the area around each reference point are compared with the sums of the absolute differences resulting from adding up the absolute differences of the luminances of the pixels in the area around the target point, as described below. The priority indicating which frame, among the two frames, greater importance is given to is set in advance. The priority will be described below.

Data about the candidate vector connecting the reference point selected by the evaluation value calculator 76 to the target point is supplied to a vector determiner 77. The vector determiner 77 allocates the candidate vector as the motion vector from the target point. The candidate vector allocated as the motion vector is output through the output terminal 15.

13. Example of Process Performed in Motion-Vector Allocating Unit in FIG. 18

Figure 19:
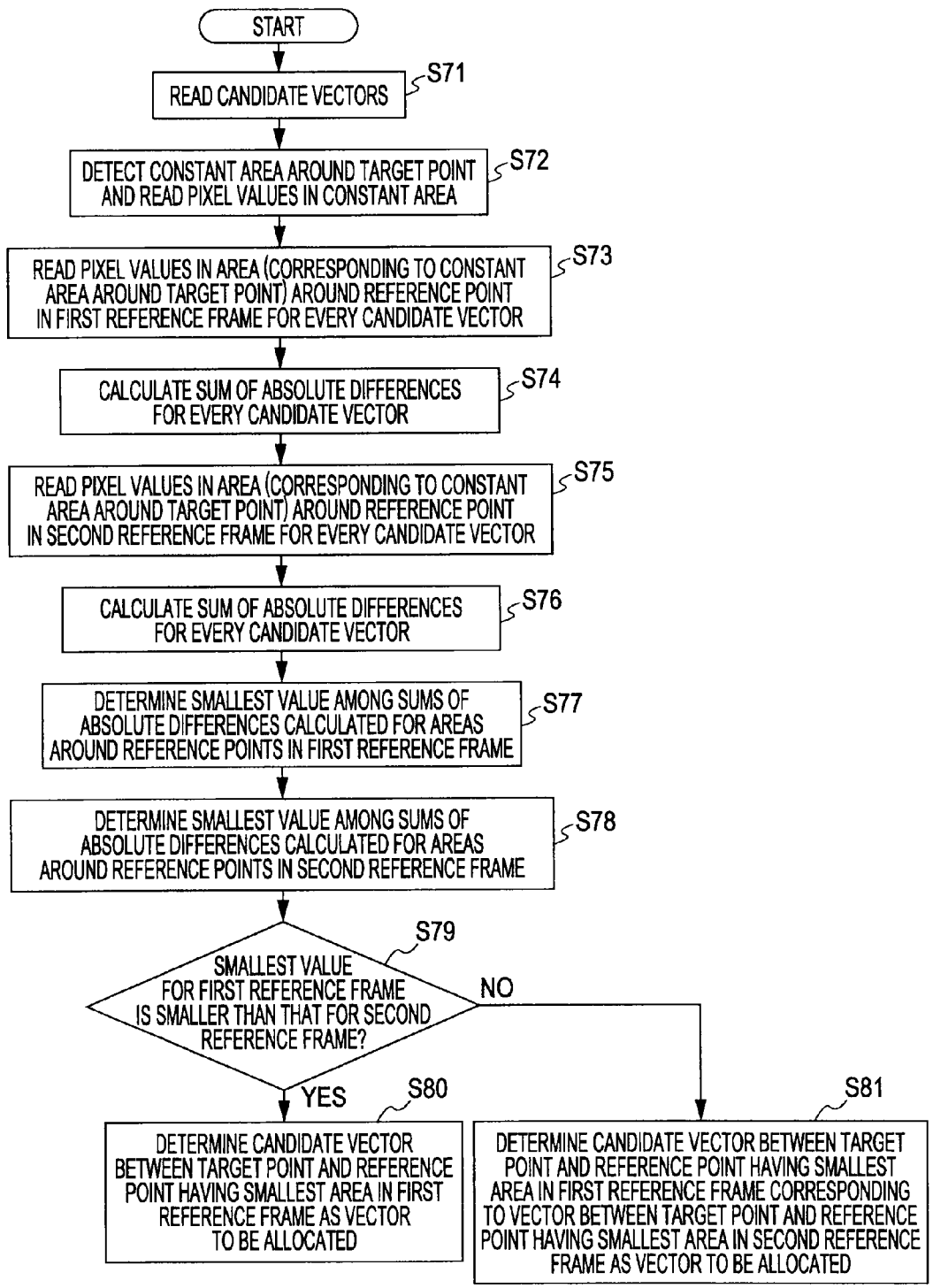
FIG. 19 is a flowchart showing an example of a process in the motion-vector allocating unit in FIG. 18.

FIG. 19 is a flowchart showing an example of a vector allocating process in the motion-vector allocating unit 14 having the configuration shown FIG. 18.

Referring to FIG. 19, in Step S71, the motion-vector allocating unit 14 reads out the candidate vectors on the basis of the data in the evaluation value table. In Step S72, the motion-vector allocating unit 14 determines the coordinate position of the target point corresponding to the readout candidate vectors and determines the pixel value at the coordinate position (the target pixel) to detect an area (constant area) around the target point, having a constant pixel value that is determined to be the same as the pixel value of the target point. The motion-vector allocating unit 14 reads out the pixel values in the constant area.

In Step S73, the motion-vector allocating unit 14 determines the coordinate positions of the reference points corresponding to all the readout candidate vectors, sets areas having the same size as that of the constant area around the pixels (the reference pixels) at the coordinate positions, and reads out the pixel values in the areas that are set from the first reference point memory 71. The readout signals concerning the reference points are signals of the first reference frame. In Step S74, the motion-vector allocating unit 14 compares the pixel level (the pixel value) of each pixel in the area around each reference point with the pixel level of the corresponding pixel in the constant area around the target point to calculate the difference for every pixel and calculates a sum of the absolute differences of all the pixels in the area around each reference point.

Then, the candidate vector connecting each reference point in the first reference frame to the target point is extended toward the second reference frame to set the point at which the extended candidate vector intersects with the second reference frame as the reference point in the second reference frame. In Step S75, the motion-vector allocating unit 14 sets areas having the same size as that of the constant area around the reference points in the second reference frame and reads out the pixel values in the areas that are set from the second reference point memory 73. The readout signals concerning the reference points are signals of the second reference frame. In Step S76, the motion-vector allocating unit 14 compares the pixel level (the pixel value) of each pixel in the area around each reference point with the pixel level of the corresponding pixel in the constant area around the target point to calculate the difference for every pixel and calculates a sum of the absolute differences of all the pixels in the area around each reference point.

In Step S77, the motion-vector allocating unit 14 determines the smallest sum of the absolute differences among the sums of the absolute differences calculated for the areas corresponding to the candidate vectors in the first reference frame. In Step S78, the motion-vector allocating unit 14 determines the smallest sum of the absolute differences among the sums of the absolute differences calculated for the areas corresponding to the candidate vectors in the second reference frame.

In Step S79, the motion-vector allocating unit 14 compares the smallest sum of the absolute differences in the first reference frame with the smallest sum of the absolute differences in the second reference frame to determine the smaller value. If the motion-vector allocating unit 14 determines that the sum of the absolute differences in the first reference frame is smaller than the sum of the absolute differences in the second reference frame, then in Step S80, the motion-vector allocating unit 14 determines the candidate vector connecting the reference point at the center of the area having the smallest sum to the target point as the motion vector to be allocated.

If the motion-vector allocating unit 14 determines in Step S79 that the sum of the absolute differences in the second reference frame is smaller than the sum of the absolute differences in the first reference frame, then in Step S81, the motion-vector allocating unit 14 determines the vector resulting from extension of the candidate vector connecting the reference point at the center of the area having the smallest sum to the target point toward the first reference frame as the motion vector to be allocated.

14. Description of Processing State in Motion-Vector Allocating Unit in FIG. 18

Figure 20:
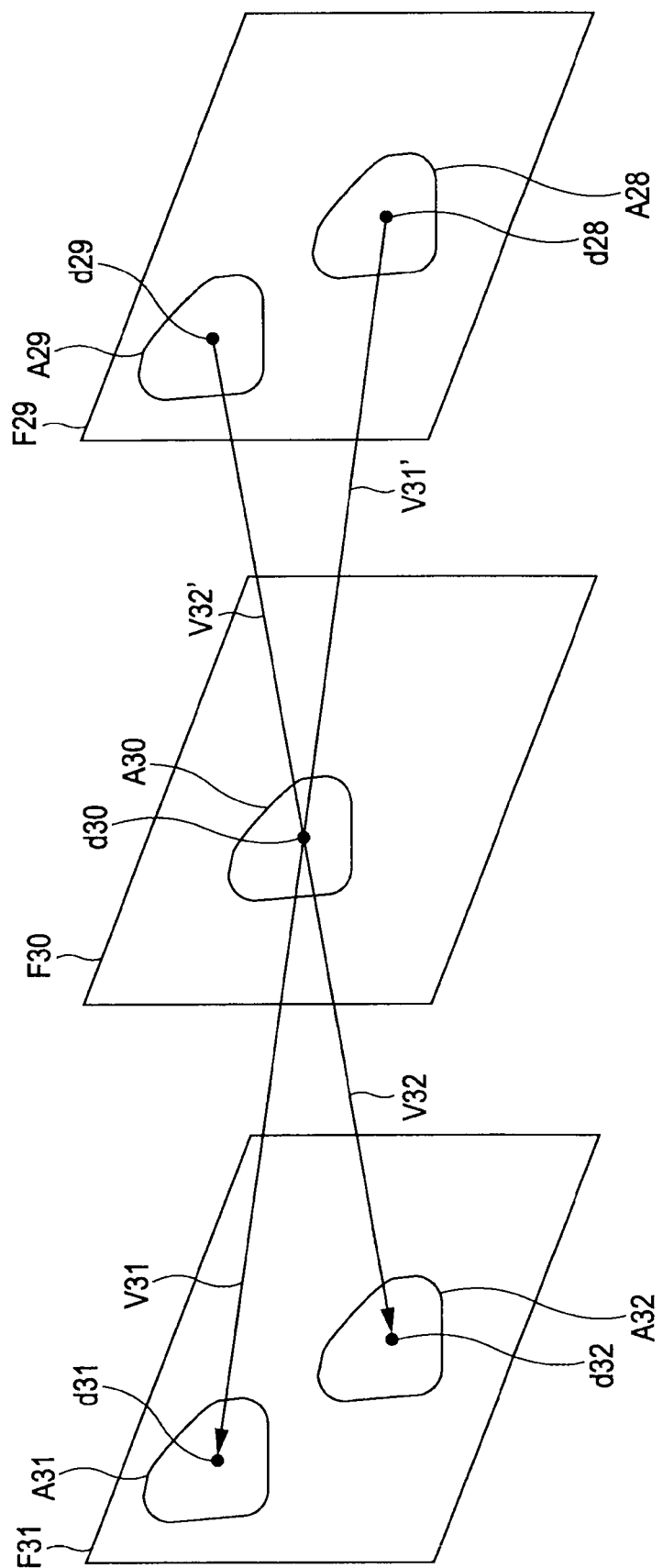
FIG. 20 illustrates an example of a processing state in the motion-vector allocating unit in FIG. 18.

FIG. 20 illustrates an example of a processing state using the configuration shown in FIG. 18 and the flowchart shown in FIG. 19.

In the example in FIG. 20, a target point d30 exists in a frame F30 (target frame) and multiple candidate vectors V31 and V32 extend from the target point d30 to a frame F31 (first reference frame) that is next to the target frame F30 on the time axis. Reference points d31 and d32 connected to the target point d30 via the candidate vectors V31 and V32, respectively, exist in the first reference frame F31.

A second reference frame F29 exists one frame before the frame F30. Reference points d28 and d29 are set at the points where the candidate vectors V31 and V32 that are extended toward the second reference frame F29 intersect with the second reference frame F29. A vector V31' connecting the target point d30 to the reference point d28 results from extension of the candidate vector V31. Similarly, a vector V32' connecting the target point d30 to the reference point d29 results from extension of the candidate vector V32.

In the frame F30, a constant area A30 is set around the target point d30. The pixel values in the constant area A30 is in the same level as the pixel value (luminance) of the target point d30.

In the first reference frame F31, areas A31 and A32 having the same size as that of the constant area A30 are set around the reference points d31 and d32, respectively. The difference between the pixel value of each pixel in the areas A31 and A32 and the pixel value of the corresponding pixel in the constant area A30 is calculated to calculate the sum of the absolute differences.

In the second reference frame F29, areas A28 and A29 having the same size as that of the constant area A30 are set around the reference points d28 and d29, respectively. The difference between the pixel value of each pixel in the areas A28 and A29 and the pixel value of the corresponding pixel in the constant area A30 is calculated to calculate the sum of the absolute differences.

The sum of the absolute differences calculated for each area in the first reference frame F31 is compared with the sum of the absolute differences calculated for each area in the second reference frame F29 in the manner described above with reference to FIG. 19. If the comparison shows that the sum of the absolute differences calculated for the area in the first reference frame F31 is smaller than the sum of the absolute differences calculated for the area in the second reference frame F29, the candidate vector corresponding to the reference point at the center of the area in the first reference frame F31 is determined as the motion vector to be allocated. If the comparison shows that the sum of the absolute differences calculated for the area in the second reference frame F29 is smaller than the sum of the absolute differences calculated for the area in the second reference frame F31, the candidate vector that results from extension of the candidate vector corresponding to the reference point in the second reference frame F29 and that connects the first reference frame F31 to the target frame F30 is determined as the motion vector to be allocated.

It is possible to accurately determine the motion vector to be allocated from the candidate vectors in the above manner.

15. Examples of Advantages of Embodiments of the Present Invention

As described above, according to the embodiments of the present invention, the reference point similar to the target point in the state of the pixels around the reference point is selected, thus accurately selecting the motion vector from the candidate vectors if the area around the target point is a constant area having a constant pixel value.

In the method of detecting the motion vector by using the evaluation value table including the data resulting from the evaluation of the target point and the reference points described in the embodiments of the present invention, the candidate vectors are searched for in units of pixels in the image. The effective evaluation can be performed in an area in which adjacent pixels have different pixel values. However, it is difficult to narrow down the candidate vectors in a constant area having a constant pixel value because the constant area includes many pixels having approximately the same pixel value. According to the embodiments of the present invention, the constant area that is adaptively set in accordance with the state of the image is used to narrow down the candidate vectors on the basis of the evaluation values of the target point and the reference points. Accordingly, it is possible to accurately determine the motion vector to be allocated from the candidate vectors even if the target point is in the constant area having a constant pixel value.

Since the constant area is adaptively set in accordance with the state of the image in the embodiments of the present invention, it is possible to accurately determine the motion vector to be allocated regardless of the size of the constant area.

In addition, the candidate vectors can be accurately detected both in constant areas and in areas including different pixel values. Accordingly, even if one image includes multiple motions, it is possible to accurately detect the motion vectors corresponding to the multiple motions in the image.

Examples of evaluation of whether the motion vector is appropriately allocated from an actual image will now be described with respect to FIGS. 21A to 21C.

Figure 21A:
FIGS. 21A to 21c show examples in which the motion vector is not appropriately allocated in the embodiments of the present invention.
Figure 21B:
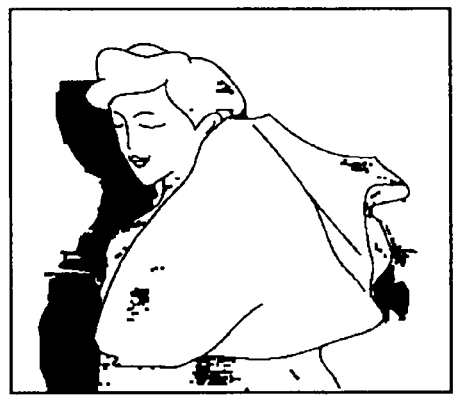
Figure 21C:
Figure 22:
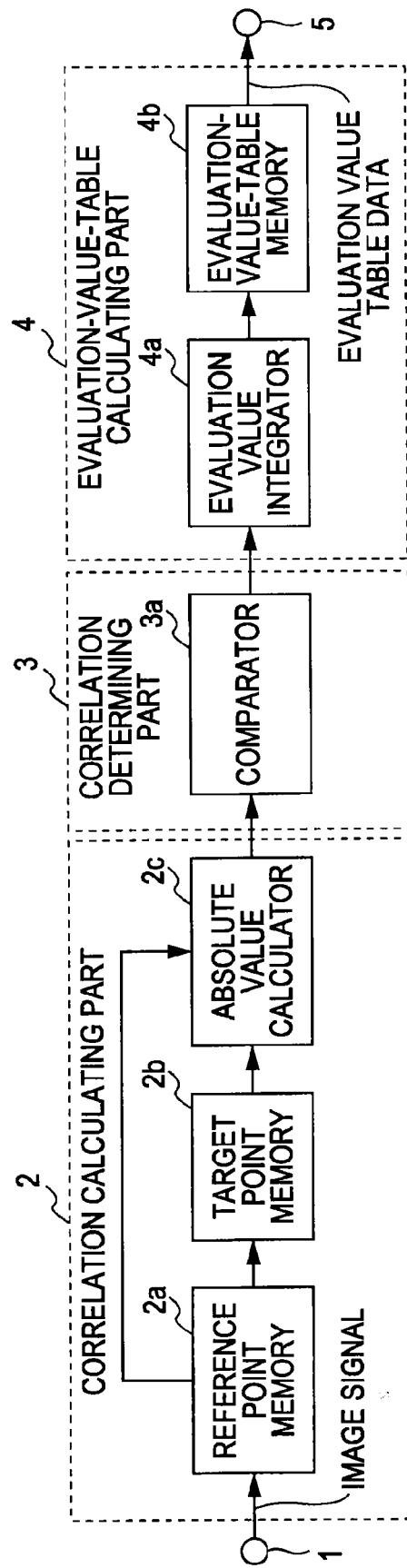
FIG. 22 is a block diagram showing an example of the configuration of an evaluation-value-table generating unit in related art.
Figure 23A:
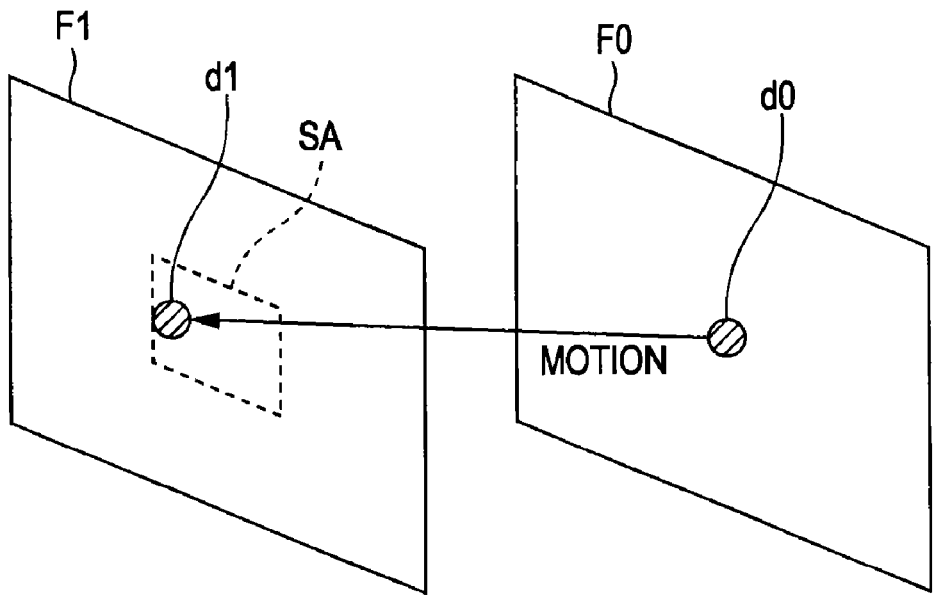
FIGS. 23A and 23B illustrate a processing state showing a target point and a reference point in evaluation value table data in the related art.
Figure 23B:
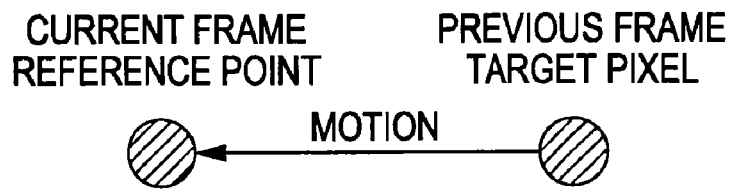

A frame image indicating a state in which a moving person lifts up a relatively large cloth is shown in FIGS. 21A to 21C. The motion vector is determined on the basis of a variation from a previous frame image. The motion vector is not appropriately allocated in blackened areas in each image.

FIG. 21A shows an example of allocation using the fixed block shown in FIG. 9 according to the flowchart shown in FIG. 8, which is described as a process in a common configuration. In the case of the image in FIG. 21A using the fixed block, many blacked and dotted areas exist in the image. This shows that many errors occur in the allocation of the motion vector. The accuracy rate of the motion vector was 72% in an experiment in the image shown in FIG. 21A.

FIG. 21B shows an example of allocation using the constant area shown in FIG. 12 according to the flowchart shown in FIG. 11 in the first embodiment of the present invention. The accuracy of the allocation state of the motion vector is totally improved in the example in FIG. 21B. The accuracy rate of the motion vector was 90% in an experiment in the image shown in FIG. 21B.

However, relatively large areas in which the allocation state of the motion vector is not appropriate exist in the image shown in FIG. 21B. A motion of the object (person) in the image relative to the previous frame occurs in the areas in which the allocation state of the motion vector is not appropriate. It is not possible to identify the target point in the previous frame in such areas.

FIG. 21C shows an example of allocation using the constant area shown in FIG. 20 according to the flowchart shown in FIG. 19 in the second embodiment of the present invention. Since the two reference frames are used to allocate the motion vector in the example in FIG. 21C, as in the example shown in FIG. 20, the motion vector is appropriately allocated even in areas in which the target point is not identified from the comparison with the previous frame because a motion of the object occurs. The accuracy rate of the motion vector was 99% in an experiment in the image shown in FIG. 21C.

Comparison between the three examples in FIGS. 21A to 21C shows that the allocation accuracy of the motion vector is improved, compared with the related art, by the methods of allocating the motion vector according to the above embodiments of the present invention.

16. Modifications of Embodiments

The process of selecting the candidate vectors by using the two reference frames according to the second embodiment may be combined with the modifications of the first embodiment. Specifically, the example in which the sum of the absolute differences of each area is normalized (shown in the flowchart in FIG. 15) or the example in which the frequency data is used (shown in the flowchart in FIG. 16) may be combined with the selection process according to the second embodiment.

Although the selection of the target point is not specifically described in the above embodiments of the present invention, for example, all the pixels in one frame may be sequentially selected as the target points and the motion vector may be detected for each pixel. Alternatively, a typical pixel in one frame may be selected as the target point and the motion vector for the selected pixel may be detected.

Although the luminance signal is used as the pixel value of an image signal in the above embodiments of the present invention, another signal component, such as a chrominance signal or a color difference signal, which can be detected in units of pixels, may be used as the pixel value of an image signal.

Although the motion vector detecting apparatus for image signals are described in the above embodiments of the present invention, the motion vector detecting apparatus may be incorporated in various image processing apparatuses. For example, the motion vector detecting apparatus may be incorporated in an encoding apparatus performing the high-efficiency encoding to perform the encoding by using motion vector data. Alternatively, the motion vector detecting apparatus may be incorporated in an image display apparatus displaying image data that is input (received) or an image recording apparatus to improve the image quality by using motion vector data.

Each component used in the detection of the motion vector in the embodiments of the present invention may be programmed and the program may be installed in various information processing apparatuses, such as a computer apparatus, performing a variety of data processing. In this case, the processes described in the embodiments of the present invention may be performed to detect the motion vector from an image signal that is input into the information processing apparatus.

The present application contains subject matter related to that disclosed in Japanese Priority Patent Application JP 2008-196614 filed in the Japan Patent Office on Jul. 30, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A motion vector detecting apparatus comprising:
   an evaluation-value information generating unit that generates evaluation value information indicating the evaluation value of a motion vector on the basis of pixel-value correlation information indicating the correlation between a target pixel in a first frame among multiple frames for moving image data and a reference pixel in a search area in a second frame, the evaluation value information indicating the result of evaluation of the possibility that the reference pixel is a candidate for a motion from the target pixel;
   a motion-vector extracting unit that extracts a candidate for the motion vector corresponding to each pixel in the frames of the moving image data on the basis of the evaluation value information generated by the evaluation-value information generating unit; and
   a motion-vector allocating unit that adaptively sets a constant area around each of the target pixel and the reference pixel corresponding to the candidate for the motion vector extracted by the motion-vector extracting unit in accordance with a state indicating the continuity of a constant pixel value and allocates the motion vector from the first frame to the second frame for each pixel on the basis of the result of comparison of the correlation between the constant areas, the motion-vector allocating unit setting the constant area to be an area including the target pixel and at least one other pixel, an absolute value of a difference between a luminance of the target pixel and a luminance of each of the at least one other pixel is less than a threshold, and each of the at least one other pixel is spatially contiguous to the target pixel.

2. The motion vector detecting apparatus according to claim 1, wherein the motion-vector allocating unit calculates a difference between the pixel value of each pixel in the constant area around the target pixel in the first frame and the pixel value of the corresponding pixel in the constant area around the reference pixel in the second frame, adds up the absolute values of the calculated differences in the constant area in the second frame to calculate the sum of the absolute differences, and allocates the motion vector corresponding to the area having the smallest sum of the absolute differences.

3. The motion vector detecting apparatus according to claim 2, wherein the motion-vector allocating unit sets a second reference pixel corresponding to the reference pixel in the first frame in a third frame that is opposite to the second frame in which the reference pixel exists with respect to the first frame in which the target pixel exists on a time axis, calculates a difference between the pixel value of each pixel in the constant area around the second reference pixel and the pixel value of the corresponding pixel in the constant area around the target pixel in the first frame, adds up the absolute values of the calculated differences in the constant area in the third frame to calculate the sum of the absolute differences, and allocates the motion vector from the first frame to the second frame on the basis of the result of comparison for the constant area around the second reference pixel.

4. The motion vector detecting apparatus according to claim 3, wherein the sum of the absolute differences calculated for the constant area around the reference pixel in the second frame is compared with the sum of the absolute differences calculated for the constant area around the second reference pixel in the third frame, the motion vector connecting the reference pixel in the second frame to the target pixel is allocated if the comparison with the constant area around the target pixel in the first frame shows that the sum of the absolute differences calculated for the constant area around the reference pixel in the second frame is smaller than the sum of the absolute differences calculated for the constant area around the second reference pixel in the third frame, and the motion vector that results from extension of the motion vector between the second reference pixel and the target pixel and that extends from the first frame to the second frame is allocated if the comparison with the constant area around the target pixel in the first frame shows that the sum of the absolute differences calculated for the constant area around the second reference pixel in the third frame is smaller than the sum of the absolute differences calculated for the constant area around the reference pixel in the second frame.

5. The motion vector detecting apparatus according to claim 2, wherein information about a frequency of a candidate vector in an evaluation value table is acquired and the candidate vector having the highest frequency is allocated as the motion vector if multiple candidate vectors have the smallest sum of the absolute differences.

6. The motion vector detecting apparatus according to claim 2, wherein an average of the absolute differences resulting from normalization of the sum of the absolute differences calculated for each constant area by using a size of the constant area or the number of pixels in the constant area is used in the comparison.

7. The motion vector detecting apparatus according to claim 1, wherein the constant area having a constant pixel value is set around each of the target pixel and the reference pixel, the size of an area where the constant area around the reference pixel overlaps with the constant area around the target pixel is determined, and the motion vector corresponding to the reference pixel in the largest constant area overlapping with the constant area around the target pixel is allocated.

8. The motion vector detecting apparatus according to any of claims 1 to 7, wherein the motion-vector extracting unit sorts the candidates for the motion vector in frequency order on the basis of the evaluation value information generated by the evaluation-value information generating unit and extracts the candidates for the motion vector up to a predetermined order from the top.

9. A motion vector detecting method comprising:
   generating evaluation value information indicating the evaluation value of the motion vector on the basis of pixel-value correlation information indicating the correlation between a target pixel in a first frame among multiple frames for moving image data and a reference pixel in a search area in a second frame, the evaluation value information indicating the result of evaluation of the possibility that the reference pixel is a candidate for a motion from the target pixel;
   extracting a candidate for the motion vector corresponding to each pixel in the frames of the moving image data on the basis of the generated evaluation value information; and
   setting a constant area having a constant pixel value around each of the target pixel and the reference pixel corresponding to the extracted candidate for the motion vector and allocating the motion vector from the first frame to the second frame for each pixel on the basis of the result of comparison between values calculated for the constant areas, the setting including setting the constant area to be an area including the target pixel and at least one other pixel, an absolute value of a difference between a luminance of the target pixel and a luminance of each of the at least one other pixel is less than a threshold, and each of the at least one other pixel is spatially contiguous to the target pixel.

10. A non-transitory computer readable medium encoded with a program which, when installed in an information processing apparatus, causes the apparatus to execute a method comprising:

generating evaluation value information indicating the evaluation value of a motion vector on the basis of pixel-value correlation information indicating the correlation between a target pixel in a first frame among multiple frames for moving image data and a reference pixel in a search area in a second frame, the evaluation value information indicating the result of evaluation of the possibility that the reference pixel is a candidate for a motion from the target pixel;

extracting a candidate for the motion vector corresponding to each pixel in the frames of the moving image data on the basis of the generated evaluation value information; and setting a constant area having a constant pixel value around each of the target pixel and the reference pixel corresponding to the extracted candidate for the motion vector and allocating the motion vector from the first frame to the second frame for each pixel on the basis of the result of comparison between values calculated for the constant areas, the setting including setting the constant area to be an area including the target pixel and at least one other pixel, an absolute value of a difference between a luminance of the target pixel and a luminance of each of the at least one other pixel is less than a threshold, and each of the at least one other pixel is spatially contiguous to the target pixel.

* * * * *